(12) United States Patent
Sampath et al.

(10) Patent No.: US 9,154,211 B2
(45) Date of Patent: Oct. 6, 2015

(54) SYSTEMS AND METHODS FOR BEAMFORMING FEEDBACK IN MULTI ANTENNA COMMUNICATION SYSTEMS

(75) Inventors: Hemanth Sampath, San Diego, CA (US); Aamod Khandekar, San Diego, CA (US); Dhananjay Ashok Gore, San Diego, CA (US); Alexei Gorokhov, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1076 days.

(21) Appl. No.: 11/233,844

(22) Filed: Sep. 21, 2005

(65) Prior Publication Data

US 2006/0203708 A1     Sep. 14, 2006

Related U.S. Application Data

(60) Provisional application No. 60/665,120, filed on Mar. 24, 2005, provisional application No. 60/691,808, filed on Jun. 16, 2005, provisional application No. 60/710,402, filed on Aug. 22, 2005.

(51) Int. Cl.
*H04L 27/00*     (2006.01)
*H04B 7/06*     (2006.01)
*H04B 7/04*     (2006.01)

(52) U.S. Cl.
CPC ............ *H04B 7/0634* (2013.01); *H04B 7/0417* (2013.01); *H04B 7/063* (2013.01); *H04B 7/0617* (2013.01); *H04B 7/0632* (2013.01); *H04B 7/0639* (2013.01); *H04B 7/0645* (2013.01)

(58) Field of Classification Search
CPC .... H04B 7/0417; H04B 7/0617; H04B 7/063; H04B 7/0645; H04B 7/0634; H04B 7/0639; H04B 7/0632

USPC ......... 375/260, 136, 146, 262, 265, 267, 295, 375/316, 340, 346, 347, 350; 455/69; 370/208, 203, 204, 205, 209, 210
See application file for complete search history.

(56) References Cited

U.S. PATENT DOCUMENTS

| 4,393,276 | A | 7/1983 | Steele et al. |
| 4,554,668 | A | 11/1985 | Deman et al. |

(Continued)

FOREIGN PATENT DOCUMENTS

| CA | 2348137 | 11/2001 |
| CA | 2477536 | 9/2003 |

(Continued)

OTHER PUBLICATIONS

International Search Report—PCT/US2006/010962, International Search Authority—European Patent Office—Aug. 4, 2006.

(Continued)

*Primary Examiner* — Dhaval Patel
(74) *Attorney, Agent, or Firm* — Howard Seo

(57) ABSTRACT

Methods and apparatuses are disclosed that determine whether to feedback, and the amount of feedback, with respect to eigenbeam information based upon channel resources. Additionally, methods and apparatuses are disclosed that determine whether to feedback, and the amount of feedback, with respect to eigenbeam information based upon channel information and changes in channel information.

79 Claims, 10 Drawing Sheets

(56) References Cited

U.S. PATENT DOCUMENTS

| | | | |
|---|---|---|---|
| 4,747,137 A | 5/1988 | Matsunaga |
| 4,783,779 A | 11/1988 | Takahata et al. |
| 4,783,780 A | 11/1988 | Alexis |
| 4,975,952 A | 12/1990 | Mabey et al. |
| 5,008,900 A | 4/1991 | Critchlow et al. |
| 5,115,248 A | 5/1992 | Roederer |
| 5,268,694 A | 12/1993 | Jan et al. |
| 5,282,222 A | 1/1994 | Fattouche et al. |
| 5,363,408 A | 11/1994 | Paik et al. |
| 5,371,761 A | 12/1994 | Daffara et al. |
| 5,384,810 A | 1/1995 | Amrany et al. |
| 5,406,551 A | 4/1995 | Saito et al. |
| 5,410,538 A | 4/1995 | Roche et al. |
| 5,455,839 A | 10/1995 | Eyuboglu et al. |
| 5,465,253 A | 11/1995 | Rahnema |
| 5,491,727 A | 2/1996 | Petit et al. |
| 5,513,379 A | 4/1996 | Benveniste et al. |
| 5,539,748 A | 7/1996 | Raith |
| 5,548,582 A | 8/1996 | Brajal et al. |
| 5,553,069 A | 9/1996 | Ueno et al. |
| 5,583,869 A | 12/1996 | Grube et al. |
| 5,594,738 A | 1/1997 | Crisler et al. |
| 5,604,744 A | 2/1997 | Andersson et al. |
| 5,612,978 A | 3/1997 | Blanchard et al. |
| 5,625,876 A | 4/1997 | Gilhousen et al. |
| 5,684,491 A | 11/1997 | Newman et al. |
| 5,726,978 A | 3/1998 | Frodigh et al. |
| 5,732,113 A | 3/1998 | Schmidl et al. |
| 5,745,487 A | 4/1998 | Hamaki |
| 5,768,276 A | 6/1998 | Diachina et al. |
| 5,790,537 A | 8/1998 | Yoon et al. |
| 5,812,938 A | 9/1998 | Gilhousen et al. |
| 5,815,488 A | 9/1998 | Williams et al. |
| 5,822,368 A | 10/1998 | Wang |
| 5,828,650 A | 10/1998 | Malkamaki et al. |
| 5,838,268 A | 11/1998 | Frenkel |
| 5,867,478 A | 2/1999 | Baum et al. |
| 5,870,393 A | 2/1999 | Yano et al. |
| 5,887,023 A | 3/1999 | Mabuchi |
| 5,907,585 A | 5/1999 | Suzuki et al. |
| 5,920,571 A | 7/1999 | Houck et al. |
| 5,926,470 A | 7/1999 | Tiedemann, Jr. |
| 5,933,421 A | 8/1999 | Alamouti et al. |
| 5,949,814 A | 9/1999 | Odenwalder et al. |
| 5,953,325 A | 9/1999 | Willars |
| 5,955,992 A | 9/1999 | Shattil |
| 5,956,642 A | 9/1999 | Larsson et al. |
| 5,995,992 A | 11/1999 | Eckard |
| 5,999,826 A | 12/1999 | Whinnett |
| 6,002,942 A | 12/1999 | Park |
| 6,016,123 A | 1/2000 | Barton et al. |
| 6,038,150 A | 3/2000 | Yee et al. |
| 6,038,263 A | 3/2000 | Kotzin et al. |
| 6,038,450 A | 3/2000 | Brink et al. |
| 6,052,364 A | 4/2000 | Chalmers et al. |
| 6,061,337 A | 5/2000 | Light et al. |
| 6,067,315 A | 5/2000 | Sandin |
| 6,075,350 A | 6/2000 | Peng et al. |
| 6,075,797 A | 6/2000 | Thomas |
| 6,076,114 A | 6/2000 | Wesley et al. |
| 6,088,345 A | 7/2000 | Sakoda et al. |
| 6,088,592 A | 7/2000 | Doner et al. |
| 6,108,323 A | 8/2000 | Gray |
| 6,108,550 A | 8/2000 | Wiorek et al. |
| 6,112,094 A | 8/2000 | Dent et al. |
| 6,128,776 A | 10/2000 | Kang et al. |
| 6,138,037 A | 10/2000 | Jaamies |
| 6,141,317 A | 10/2000 | Marchok et al. |
| 6,154,484 A | 11/2000 | Lee et al. |
| 6,169,910 B1 | 1/2001 | Tamil et al. |
| 6,172,993 B1 | 1/2001 | Kim et al. |
| 6,175,550 B1 | 1/2001 | Van Nee et al. |
| 6,175,650 B1 | 1/2001 | Sindhu et al. |
| 6,176,550 B1 | 1/2001 | Lamart et al. |
| 6,198,775 B1 | 3/2001 | Khayrallah et al. |
| 6,215,983 B1 | 4/2001 | Dogan et al. |
| 6,226,280 B1 | 5/2001 | Roark et al. |
| 6,232,918 B1 * | 5/2001 | Wax et al. ............... 342/360 |
| 6,240,129 B1 | 5/2001 | Reusens et al. |
| 6,249,683 B1 | 6/2001 | Lundby et al. |
| 6,256,478 B1 | 7/2001 | Allen et al. |
| 6,271,946 B1 | 8/2001 | Chang et al. |
| 6,272,122 B1 | 8/2001 | Wee |
| 6,310,704 B1 | 10/2001 | Dogan et al. |
| 6,317,435 B1 | 11/2001 | Tiedemann, Jr. et al. |
| 6,335,922 B1 | 1/2002 | Tiedemann, Jr. et al. |
| 6,337,659 B1 | 1/2002 | Kim et al. |
| 6,337,983 B1 | 1/2002 | Bonta et al. |
| 6,353,637 B1 | 3/2002 | Mansour et al. |
| 6,363,060 B1 | 3/2002 | Sarkar |
| 6,374,115 B1 | 4/2002 | Barnes et al. |
| 6,377,539 B1 | 4/2002 | Kang et al. |
| 6,377,809 B1 | 4/2002 | Rezaiifar et al. |
| 6,388,998 B1 | 5/2002 | Kasturia et al. |
| 6,393,008 B1 | 5/2002 | Cheng et al. |
| 6,393,012 B1 | 5/2002 | Pankaj |
| 6,401,062 B1 | 6/2002 | Murashima |
| 6,438,369 B1 | 8/2002 | Huang et al. |
| 6,449,246 B1 | 9/2002 | Barton et al. |
| 6,466,800 B1 | 10/2002 | Sydon et al. |
| 6,473,467 B1 | 10/2002 | Wallace et al. |
| 6,477,317 B1 | 11/2002 | Itokawa |
| 6,478,422 B1 | 11/2002 | Hansen |
| 6,483,820 B1 | 11/2002 | Davidson et al. |
| 6,487,243 B1 | 11/2002 | Hwang et al. |
| 6,496,790 B1 | 12/2002 | Kathavate et al. |
| 6,501,810 B1 | 12/2002 | Karim et al. |
| 6,507,601 B2 | 1/2003 | Parsa et al. |
| 6,519,462 B1 | 2/2003 | Lu et al. |
| 6,529,525 B1 | 3/2003 | Pecen et al. |
| 6,535,666 B1 | 3/2003 | Dogan et al. |
| 6,539,008 B1 | 3/2003 | Ahn et al. |
| 6,539,213 B1 | 3/2003 | Richards et al. |
| 6,542,485 B1 | 4/2003 | Mujtaba et al. |
| 6,542,743 B1 | 4/2003 | Soliman |
| 6,563,806 B1 | 5/2003 | Yano et al. |
| 6,563,881 B1 | 5/2003 | Sakoda et al. |
| 6,577,739 B1 | 6/2003 | Hurtig et al. |
| 6,584,140 B1 | 6/2003 | Lee et al. |
| 6,590,881 B1 | 7/2003 | Wallace et al. |
| 6,597,746 B1 | 7/2003 | Amrany et al. |
| 6,601,206 B1 | 7/2003 | Marvasti |
| 6,614,857 B1 | 9/2003 | Buehrer et al. |
| 6,625,172 B2 | 9/2003 | Odenwalder et al. |
| 6,636,568 B2 | 10/2003 | Kadous et al. |
| 6,654,339 B1 | 11/2003 | Bohnke et al. |
| 6,654,431 B1 | 11/2003 | Barton et al. |
| 6,657,949 B1 | 12/2003 | Jones, IV et al. |
| 6,658,258 B1 | 12/2003 | Chen et al. |
| 6,674,787 B1 | 1/2004 | Dick et al. |
| 6,674,810 B1 | 1/2004 | Cheng et al. |
| 6,675,012 B2 | 1/2004 | Gray et al. |
| 6,678,318 B1 | 1/2004 | Lai et al. |
| 6,690,951 B1 | 2/2004 | Cuffaro et al. |
| 6,693,952 B1 | 2/2004 | Chuah et al. |
| 6,701,165 B1 | 3/2004 | Ho et al. |
| 6,704,571 B1 | 3/2004 | Moon |
| 6,711,400 B1 | 3/2004 | Aura |
| 6,717,908 B2 | 4/2004 | Vijayan et al. |
| 6,721,568 B1 | 4/2004 | Gustavsson et al. |
| 6,724,719 B1 | 4/2004 | Tong et al. |
| 6,731,602 B1 | 5/2004 | Watanabe et al. |
| 6,735,244 B1 | 5/2004 | Hasegawa et al. |
| 6,744,743 B2 | 6/2004 | Walton et al. |
| 6,748,220 B1 | 6/2004 | Chow et al. |
| 6,751,444 B1 | 6/2004 | Meiyappan |
| 6,751,456 B2 | 6/2004 | Bilgic et al. |
| 6,754,511 B1 | 6/2004 | Halford et al. |
| 6,763,009 B1 | 7/2004 | Bedekar et al. |
| 6,765,969 B1 | 7/2004 | Vook et al. |
| 6,776,165 B2 | 8/2004 | Jin et al. |
| 6,776,765 B2 | 8/2004 | Soukup et al. |
| 6,778,513 B2 | 8/2004 | Kasapi et al. |
| 6,785,341 B2 | 8/2004 | Walton et al. |

(56) References Cited

U.S. PATENT DOCUMENTS

| | | |
|---|---|---|
| 6,798,736 B1 | 9/2004 | Black et al. |
| 6,799,043 B2 | 9/2004 | Tiedemann, Jr. et al. |
| 6,802,035 B2 | 10/2004 | Catreux et al. |
| 6,804,307 B1 | 10/2004 | Popovic |
| 6,813,284 B2 | 11/2004 | Vayanos et al. |
| 6,821,535 B2 | 11/2004 | Nurmi et al. |
| 6,828,293 B1 | 12/2004 | Hazenkamp et al. |
| 6,829,293 B2 | 12/2004 | Jones et al. |
| 6,831,943 B1 | 12/2004 | Dabak et al. |
| 6,842,487 B1 | 1/2005 | Larsson |
| 6,850,481 B2 | 2/2005 | Wu et al. |
| 6,850,509 B2 | 2/2005 | Lee et al. |
| 6,862,271 B2 | 3/2005 | Medvedev et al. |
| 6,870,808 B1 | 3/2005 | Liu et al. |
| 6,870,826 B1 | 3/2005 | Ishizu et al. |
| 6,904,097 B2 | 6/2005 | Agami et al. |
| 6,904,283 B2 | 6/2005 | Li et al. |
| 6,904,550 B2 | 6/2005 | Sibecas et al. |
| 6,907,020 B2 | 6/2005 | Periyalwar et al. |
| 6,907,269 B2 | 6/2005 | Yamaguchi et al. |
| 6,909,707 B2 | 6/2005 | Rotstein et al. |
| 6,909,797 B2 | 6/2005 | Romsdahl et al. |
| 6,917,602 B2 | 7/2005 | Toskala et al. |
| 6,917,821 B2 | 7/2005 | Kadous et al. |
| 6,927,728 B2 | 8/2005 | Vook et al. |
| 6,928,047 B1 | 8/2005 | Xia et al. |
| 6,934,266 B2 | 8/2005 | Dulin et al. |
| 6,934,275 B1 | 8/2005 | Love et al. |
| 6,934,340 B1 | 8/2005 | Dollard et al. |
| 6,940,827 B2 | 9/2005 | Li et al. |
| 6,940,842 B2 | 9/2005 | Proctor, Jr. |
| 6,940,845 B2 | 9/2005 | Benveniste et al. |
| 6,954,448 B2 | 10/2005 | Farley et al. |
| 6,954,481 B1 | 10/2005 | Laroia et al. |
| 6,954,622 B2 | 10/2005 | Nelson et al. |
| 6,961,364 B1 | 11/2005 | Laroia et al. |
| 6,963,543 B2 | 11/2005 | Diep et al. |
| 6,970,682 B2 | 11/2005 | Crilly, Jr. et al. |
| 6,975,868 B2 | 12/2005 | Joshi et al. |
| 6,980,540 B1 | 12/2005 | Laroia et al. |
| 6,985,434 B2 | 1/2006 | Wu et al. |
| 6,985,453 B2 | 1/2006 | Lundby et al. |
| 6,985,466 B1 | 1/2006 | Yun et al. |
| 6,985,498 B2 | 1/2006 | Laroia et al. |
| 6,987,746 B1 | 1/2006 | Song |
| 6,993,342 B2 | 1/2006 | Kuchibhotla et al. |
| 7,002,900 B2 | 2/2006 | Walton et al. |
| 7,006,529 B2 | 2/2006 | Alastalo et al. |
| 7,006,557 B2 | 2/2006 | Subrahmanya et al. |
| 7,006,848 B2 | 2/2006 | Ling et al. |
| 7,009,500 B2 | 3/2006 | Rao et al. |
| 7,010,048 B1 | 3/2006 | Shattil et al. |
| 7,013,143 B2 | 3/2006 | Love et al. |
| 7,016,318 B2 | 3/2006 | Pankaj et al. |
| 7,016,319 B2 | 3/2006 | Baum et al. |
| 7,016,425 B1 | 3/2006 | Kraiem et al. |
| 7,020,110 B2 | 3/2006 | Walton et al. |
| 7,023,880 B2 | 4/2006 | El-Maleh et al. |
| 7,039,356 B2 | 5/2006 | Nguyen et al. |
| 7,039,370 B2 | 5/2006 | Laroia et al. |
| 7,042,856 B2 | 5/2006 | Walton et al. |
| 7,042,857 B2 | 5/2006 | Krishnan et al. |
| 7,047,006 B2 | 5/2006 | Classon et al. |
| 7,050,402 B2 | 5/2006 | Schmidl et al. |
| 7,050,405 B2 | 5/2006 | Attar et al. |
| 7,054,301 B1 | 5/2006 | Sousa et al. |
| 7,061,898 B2 | 6/2006 | Hashem et al. |
| 7,069,009 B2 | 6/2006 | Li et al. |
| 7,072,315 B1 | 7/2006 | Liu et al. |
| 7,079,867 B2 | 7/2006 | Chun et al. |
| 7,085,574 B2 | 8/2006 | Gaal et al. |
| 7,095,708 B1 | 8/2006 | Alamouti et al. |
| 7,095,709 B2 | 8/2006 | Walton et al. |
| 7,099,299 B2 | 8/2006 | Liang et al. |
| 7,099,630 B2 | 8/2006 | Brunner et al. |
| 7,103,384 B2 | 9/2006 | Chun et al. |
| 7,106,319 B2 | 9/2006 | Ishiyama |
| 7,113,808 B2 | 9/2006 | Hwang et al. |
| 7,120,134 B2 | 10/2006 | Tiedemann, Jr. et al. |
| 7,120,395 B2 | 10/2006 | Tong et al. |
| 7,126,928 B2 | 10/2006 | Tiedemann, Jr. et al. |
| 7,131,086 B2 | 10/2006 | Yamasaki et al. |
| 7,133,460 B2 | 11/2006 | Bae et al. |
| 7,139,328 B2 | 11/2006 | Thomas et al. |
| 7,142,864 B2 | 11/2006 | Laroia et al. |
| 7,145,940 B2 | 12/2006 | Gore et al. |
| 7,145,959 B2 | 12/2006 | Harel et al. |
| 7,149,199 B2 | 12/2006 | Sung et al. |
| 7,149,238 B2 | 12/2006 | Agee et al. |
| 7,151,761 B1 | 12/2006 | Palenius et al. |
| 7,151,936 B2 | 12/2006 | Wager et al. |
| 7,154,936 B2 | 12/2006 | Bjerke et al. |
| 7,155,236 B2 | 12/2006 | Chen et al. |
| 7,157,351 B2 | 1/2007 | Cheng et al. |
| 7,161,971 B2 | 1/2007 | Tiedemann, Jr. et al. |
| 7,164,649 B2 | 1/2007 | Walton et al. |
| 7,164,696 B2 | 1/2007 | Sano et al. |
| 7,167,916 B2 | 1/2007 | Willen et al. |
| 7,170,937 B2 | 1/2007 | Zhou |
| 7,177,297 B2 | 2/2007 | Agrawal et al. |
| 7,177,351 B2 | 2/2007 | Kadous |
| 7,180,627 B2 | 2/2007 | Moylan et al. |
| 7,181,170 B2 | 2/2007 | Love et al. |
| 7,184,426 B2 | 2/2007 | Padovani et al. |
| 7,184,713 B2 | 2/2007 | Kadous et al. |
| 7,188,300 B2 | 3/2007 | Eriksson et al. |
| 7,197,282 B2 | 3/2007 | Dent et al. |
| 7,200,177 B2 | 4/2007 | Miyoshi et al. |
| 7,209,712 B2 | 4/2007 | Holtzman |
| 7,215,979 B2 | 5/2007 | Nakagawa et al. |
| 7,230,942 B2 | 6/2007 | Laroia et al. |
| 7,233,634 B1 | 6/2007 | Hassell Sweatman et al. |
| 7,236,747 B1 | 6/2007 | Meacham et al. |
| 7,242,722 B2 | 7/2007 | Krauss et al. |
| 7,243,150 B2 | 7/2007 | Sher et al. |
| 7,248,559 B2 | 7/2007 | Ma et al. |
| 7,248,841 B2 | 7/2007 | Agee et al. |
| 7,254,158 B2 | 8/2007 | Agrawal et al. |
| 7,257,167 B2 | 8/2007 | Lau et al. |
| 7,257,406 B2 | 8/2007 | Ji et al. |
| 7,257,423 B2 | 8/2007 | Iochi et al. |
| 7,260,153 B2 | 8/2007 | Nissani |
| 7,280,467 B2 | 10/2007 | Smee et al. |
| 7,289,570 B2 * | 10/2007 | Schmidl et al. ............ 375/267 |
| 7,289,585 B2 | 10/2007 | Sandhu et al. |
| 7,290,195 B2 | 10/2007 | Guo et al. |
| 7,292,651 B2 | 11/2007 | Li |
| 7,292,863 B2 | 11/2007 | Chen et al. |
| 7,295,509 B2 | 11/2007 | Laroia et al. |
| 7,313,086 B2 | 12/2007 | Aizawa et al. |
| 7,313,126 B2 | 12/2007 | Yun et al. |
| 7,313,174 B2 | 12/2007 | Alard et al. |
| 7,313,407 B2 | 12/2007 | Shapira et al. |
| 7,327,812 B2 | 2/2008 | Auer et al. |
| 7,330,701 B2 | 2/2008 | Mukkavilli et al. |
| 7,336,727 B2 * | 2/2008 | Mukkavilli et al. ......... 375/299 |
| 7,349,371 B2 | 3/2008 | Schein et al. |
| 7,349,667 B2 * | 3/2008 | Magee et al. ............. 455/63.4 |
| 7,356,000 B2 | 4/2008 | Oprescu-Surcobe et al. |
| 7,356,005 B2 * | 4/2008 | Derryberry et al. ......... 370/335 |
| 7,356,073 B2 | 4/2008 | Heikkila |
| 7,359,327 B2 | 4/2008 | Oshiba |
| 7,363,055 B2 | 4/2008 | Castrogiovanni et al. |
| 7,366,223 B1 | 4/2008 | Chen et al. |
| 7,366,253 B2 * | 4/2008 | Kim et al. ................. 375/299 |
| 7,366,520 B2 | 4/2008 | Haustein et al. |
| 7,369,531 B2 | 5/2008 | Cho et al. |
| 7,372,911 B1 * | 5/2008 | Lindskog et al. ........... 375/267 |
| 7,372,912 B2 | 5/2008 | Seo et al. |
| 7,379,489 B2 | 5/2008 | Zuniga et al. |
| 7,382,764 B2 | 6/2008 | Uehara et al. |
| 7,392,014 B2 | 6/2008 | Baker et al. |
| 7,394,865 B2 | 7/2008 | Borran et al. |
| 7,403,745 B2 | 7/2008 | Dominique et al. |

(56) References Cited

U.S. PATENT DOCUMENTS

| | | |
|---|---|---|
| 7,403,748 B1 | 7/2008 | Keskitalo et al. |
| 7,406,119 B2 | 7/2008 | Yamano et al. |
| 7,406,336 B2 * | 7/2008 | Astely et al. ............... 455/562.1 |
| 7,411,898 B2 | 8/2008 | Erlich et al. |
| 7,412,212 B2 * | 8/2008 | Hottinen ....................... 455/101 |
| 7,418,043 B2 | 8/2008 | Shattil et al. |
| 7,418,246 B2 | 8/2008 | Kim et al. |
| 7,423,991 B2 | 9/2008 | Cho et al. |
| 7,426,426 B2 | 9/2008 | Van Baren et al. |
| 7,428,426 B2 | 9/2008 | Kiran et al. |
| 7,433,661 B2 | 10/2008 | Kogiantis et al. |
| 7,437,164 B2 | 10/2008 | Agrawal et al. |
| 7,443,835 B2 | 10/2008 | Lakshmi Narayanan et al. |
| 7,447,270 B1 * | 11/2008 | Hottinen ....................... 375/267 |
| 7,450,532 B2 | 11/2008 | Chae et al. |
| 7,450,548 B2 | 11/2008 | Haustein et al. |
| 7,463,698 B2 | 12/2008 | Fujii et al. |
| 7,468,943 B2 | 12/2008 | Gu et al. |
| 7,469,011 B2 | 12/2008 | Lin et al. |
| 7,471,963 B2 | 12/2008 | Kim et al. |
| 7,483,408 B2 | 1/2009 | Bevan et al. |
| 7,483,719 B2 | 1/2009 | Kim et al. |
| 7,486,408 B2 | 2/2009 | Van Der Schaar et al. |
| 7,486,735 B2 | 2/2009 | Dubuc et al. |
| 7,492,788 B2 | 2/2009 | Zhang et al. |
| 7,499,393 B2 | 3/2009 | Ozluturk et al. |
| 7,508,748 B2 | 3/2009 | Kadous |
| 7,508,842 B2 | 3/2009 | Baum et al. |
| 7,512,096 B2 | 3/2009 | Kuzminskiy et al. |
| 7,545,867 B1 | 6/2009 | Lou et al. |
| 7,548,506 B2 | 6/2009 | Ma et al. |
| 7,551,546 B2 | 6/2009 | Ma et al. |
| 7,551,564 B2 | 6/2009 | Mattina |
| 7,558,293 B2 | 7/2009 | Choi et al. |
| 7,567,621 B2 | 7/2009 | Sampath et al. |
| 7,573,900 B2 | 8/2009 | Kim et al. |
| 7,599,327 B2 | 10/2009 | Zhuang |
| 7,616,955 B2 | 11/2009 | Kim et al. |
| 7,627,051 B2 | 12/2009 | Shen et al. |
| 7,664,061 B2 * | 2/2010 | Hottinen ....................... 370/310 |
| 7,676,007 B1 | 3/2010 | Choi et al. |
| 7,684,507 B2 | 3/2010 | Levy |
| 7,724,777 B2 | 5/2010 | Sutivong et al. |
| 7,768,979 B2 | 8/2010 | Sutivong et al. |
| 7,899,497 B2 | 3/2011 | Kish et al. |
| 7,916,624 B2 | 3/2011 | Laroia et al. |
| 7,924,699 B2 | 4/2011 | Laroia et al. |
| 7,990,843 B2 | 8/2011 | Laroia et al. |
| 7,990,844 B2 | 8/2011 | Laroia et al. |
| 8,045,512 B2 | 10/2011 | Khandekar et al. |
| 8,095,141 B2 | 1/2012 | Teague |
| 8,098,568 B2 | 1/2012 | Laroia et al. |
| 8,098,569 B2 | 1/2012 | Laroia et al. |
| 8,199,634 B2 | 6/2012 | Laroia et al. |
| 8,218,425 B2 | 7/2012 | Laroia et al. |
| 8,223,627 B2 | 7/2012 | Laroia et al. |
| 8,331,463 B2 | 12/2012 | Jayaraman et al. |
| 8,446,892 B2 | 5/2013 | Ji et al. |
| 8,462,859 B2 | 6/2013 | Sampath et al. |
| 8,477,684 B2 | 7/2013 | Khandekar et al. |
| 8,879,511 B2 | 11/2014 | Agrawal et al. |
| 8,885,628 B2 | 11/2014 | Palanki et al. |
| 2001/0021180 A1 | 9/2001 | Lee et al. |
| 2001/0021650 A1 | 9/2001 | Bilgic et al. |
| 2001/0024427 A1 | 9/2001 | Suzuki |
| 2001/0030948 A1 | 10/2001 | Tiedemann, Jr. |
| 2001/0047424 A1 | 11/2001 | Alastalo et al. |
| 2001/0053140 A1 | 12/2001 | Choi et al. |
| 2001/0055294 A1 | 12/2001 | Motoyoshi et al. |
| 2001/0055297 A1 | 12/2001 | Benveniste et al. |
| 2002/0000948 A1 | 1/2002 | Chun et al. |
| 2002/0015405 A1 | 2/2002 | Sepponen et al. |
| 2002/0018157 A1 | 2/2002 | Zhang et al. |
| 2002/0039912 A1 | 4/2002 | Yamaguchi et al. |
| 2002/0044524 A1 | 4/2002 | Laroia et al. |
| 2002/0058525 A1 | 5/2002 | Kasapi et al. |
| 2002/0061742 A1 | 5/2002 | Lapaille et al. |
| 2002/0077152 A1 | 6/2002 | Johnson et al. |
| 2002/0085521 A1 | 7/2002 | Tripathi et al. |
| 2002/0090004 A1 | 7/2002 | Rinchiuso |
| 2002/0090024 A1 | 7/2002 | Tan et al. |
| 2002/0101839 A1 | 8/2002 | Farley et al. |
| 2002/0122381 A1 | 9/2002 | Wu et al. |
| 2002/0122400 A1 | 9/2002 | Vayanos et al. |
| 2002/0122403 A1 | 9/2002 | Hashem et al. |
| 2002/0128035 A1 | 9/2002 | Jokinen et al. |
| 2002/0147953 A1 | 10/2002 | Catreux et al. |
| 2002/0159422 A1 | 10/2002 | Li et al. |
| 2002/0160769 A1 | 10/2002 | Gray |
| 2002/0160781 A1 | 10/2002 | Bark et al. |
| 2002/0168946 A1 | 11/2002 | Aizawa et al. |
| 2002/0172293 A1 | 11/2002 | Kuchi et al. |
| 2002/0176398 A1 | 11/2002 | Nidda |
| 2002/0181571 A1 | 12/2002 | Yamano et al. |
| 2002/0191569 A1 | 12/2002 | Sung et al. |
| 2002/0193146 A1 | 12/2002 | Wallace et al. |
| 2003/0002464 A1 | 1/2003 | Rezaiifar et al. |
| 2003/0020651 A1 | 1/2003 | Crilly, Jr. et al. |
| 2003/0027579 A1 | 2/2003 | Sydon |
| 2003/0035491 A1 | 2/2003 | Walton et al. |
| 2003/0036359 A1 | 2/2003 | Dent et al. |
| 2003/0040283 A1 | 2/2003 | Kawai et al. |
| 2003/0043732 A1 | 3/2003 | Walton et al. |
| 2003/0043764 A1 | 3/2003 | Kim et al. |
| 2003/0063579 A1 | 4/2003 | Lee |
| 2003/0068983 A1 | 4/2003 | Kim et al. |
| 2003/0072254 A1 | 4/2003 | Ma et al. |
| 2003/0072255 A1 | 4/2003 | Ma et al. |
| 2003/0072280 A1 | 4/2003 | McFarland et al. |
| 2003/0072395 A1 | 4/2003 | Jia et al. |
| 2003/0073409 A1 | 4/2003 | Nobukiyo et al. |
| 2003/0073464 A1 | 4/2003 | Giannakis et al. |
| 2003/0076890 A1 | 4/2003 | Hochwald et al. |
| 2003/0086371 A1 | 5/2003 | Walton et al. |
| 2003/0086393 A1 | 5/2003 | Vasudevan et al. |
| 2003/0096579 A1 | 5/2003 | Ito et al. |
| 2003/0103520 A1 | 6/2003 | Chen et al. |
| 2003/0109226 A1 | 6/2003 | Brunner et al. |
| 2003/0112745 A1 | 6/2003 | Zhuang et al. |
| 2003/0123414 A1 | 7/2003 | Tong et al. |
| 2003/0125040 A1 | 7/2003 | Walton et al. |
| 2003/0128658 A1 | 7/2003 | Walton et al. |
| 2003/0133426 A1 | 7/2003 | Schein et al. |
| 2003/0142648 A1 | 7/2003 | Semper |
| 2003/0142729 A1 | 7/2003 | Subrahmanya et al. |
| 2003/0147371 A1 | 8/2003 | Choi et al. |
| 2003/0157900 A1 | 8/2003 | Gaal et al. |
| 2003/0161281 A1 | 8/2003 | Dulin et al. |
| 2003/0161282 A1 | 8/2003 | Medvedev et al. |
| 2003/0165189 A1 | 9/2003 | Kadous et al. |
| 2003/0181170 A1 | 9/2003 | Sim |
| 2003/0185310 A1 | 10/2003 | Ketchum et al. |
| 2003/0190897 A1 | 10/2003 | Lei et al. |
| 2003/0193915 A1 | 10/2003 | Lee et al. |
| 2003/0202491 A1 | 10/2003 | Tiedemann, Jr. et al. |
| 2003/0202560 A1 | 10/2003 | Tiedemann, Jr. et al. |
| 2003/0216156 A1 | 11/2003 | Chun et al. |
| 2003/0228850 A1 | 12/2003 | Hwang |
| 2003/0235255 A1 | 12/2003 | Ketchum et al. |
| 2004/0001429 A1 | 1/2004 | Ma et al. |
| 2004/0001460 A1 | 1/2004 | Bevan et al. |
| 2004/0002364 A1 | 1/2004 | Trikkonen et al. |
| 2004/0009783 A1 | 1/2004 | Miyoshi et al. |
| 2004/0010623 A1 | 1/2004 | Sher et al. |
| 2004/0015692 A1 | 1/2004 | Green et al. |
| 2004/0017785 A1 | 1/2004 | Zelst et al. |
| 2004/0032443 A1 | 2/2004 | Moylan et al. |
| 2004/0042558 A1 | 3/2004 | Hwang et al. |
| 2004/0048609 A1 | 3/2004 | Kosaka et al. |
| 2004/0048630 A1 | 3/2004 | Shapira et al. |
| 2004/0054999 A1 | 3/2004 | Willen et al. |
| 2004/0057394 A1 | 3/2004 | Holtzman et al. |
| 2004/0058687 A1 | 3/2004 | Kim et al. |
| 2004/0066754 A1 | 4/2004 | Hottinen et al. |

(56) References Cited

U.S. PATENT DOCUMENTS

| | | |
|---|---|---|
| 2004/0066761 A1* | 4/2004 | Giannakis et al. ............ 370/329 |
| 2004/0066772 A1 | 4/2004 | Moon et al. |
| 2004/0067756 A1 | 4/2004 | Wager et al. |
| 2004/0072565 A1 | 4/2004 | Nobukiyo et al. |
| 2004/0076185 A1 | 4/2004 | Kim et al. |
| 2004/0077345 A1 | 4/2004 | Turner et al. |
| 2004/0077379 A1 | 4/2004 | Smith et al. |
| 2004/0081073 A1 | 4/2004 | Walton et al. |
| 2004/0081195 A1 | 4/2004 | El-Maleh et al. |
| 2004/0087325 A1 | 5/2004 | Cheng et al. |
| 2004/0095907 A1 | 5/2004 | Agee et al. |
| 2004/0097215 A1 | 5/2004 | Abe et al. |
| 2004/0097240 A1 | 5/2004 | Chen et al. |
| 2004/0098505 A1 | 5/2004 | Clemmensen et al. |
| 2004/0105489 A1 | 6/2004 | Kim et al. |
| 2004/0114618 A1 | 6/2004 | Tong et al. |
| 2004/0120411 A1 | 6/2004 | Walton et al. |
| 2004/0125792 A1 | 7/2004 | Bradbury et al. |
| 2004/0128605 A1 | 7/2004 | Sibecas et al. |
| 2004/0131007 A1 | 7/2004 | Smee et al. |
| 2004/0131008 A1 | 7/2004 | Zuniga et al. |
| 2004/0131038 A1 | 7/2004 | Kim et al. |
| 2004/0131110 A1 | 7/2004 | Alard et al. |
| 2004/0136344 A1 | 7/2004 | Kim et al. |
| 2004/0136349 A1 | 7/2004 | Walton et al. |
| 2004/0156328 A1 | 8/2004 | Walton et al. |
| 2004/0160914 A1 | 8/2004 | Sarkar et al. |
| 2004/0160933 A1 | 8/2004 | Odenwalder et al. |
| 2004/0162083 A1 | 8/2004 | Chen et al. |
| 2004/0165564 A1 | 8/2004 | Kim et al. |
| 2004/0166867 A1 | 8/2004 | Hawe et al. |
| 2004/0166887 A1 | 8/2004 | Laroia et al. |
| 2004/0170152 A1 | 9/2004 | Nagao et al. |
| 2004/0170157 A1 | 9/2004 | Kim et al. |
| 2004/0171384 A1 | 9/2004 | Holma et al. |
| 2004/0171385 A1 | 9/2004 | Haustein et al. |
| 2004/0178954 A1 | 9/2004 | Vook et al. |
| 2004/0179480 A1 | 9/2004 | Attar et al. |
| 2004/0179494 A1 | 9/2004 | Attar et al. |
| 2004/0179506 A1 | 9/2004 | Padovani et al. |
| 2004/0179627 A1 | 9/2004 | Ketchum et al. |
| 2004/0181569 A1 | 9/2004 | Attar et al. |
| 2004/0185792 A1 | 9/2004 | Alexiou et al. |
| 2004/0190640 A1 | 9/2004 | Dubuc et al. |
| 2004/0202257 A1 | 10/2004 | Mehta et al. |
| 2004/0208138 A1 | 10/2004 | Hayashi et al. |
| 2004/0218520 A1 | 11/2004 | Aizawa et al. |
| 2004/0219819 A1 | 11/2004 | Di Mascio et al. |
| 2004/0219919 A1 | 11/2004 | Whinnett et al. |
| 2004/0224711 A1 | 11/2004 | Panchal et al. |
| 2004/0228267 A1 | 11/2004 | Agrawal et al. |
| 2004/0228313 A1 | 11/2004 | Cheng et al. |
| 2004/0229615 A1 | 11/2004 | Agrawal et al. |
| 2004/0240419 A1 | 12/2004 | Abrishamkar et al. |
| 2004/0240572 A1 | 12/2004 | Brutel et al. |
| 2004/0248604 A1 | 12/2004 | Vaidyanathan et al. |
| 2004/0252529 A1 | 12/2004 | Huber et al. |
| 2004/0252629 A1 | 12/2004 | Hasegawa et al. |
| 2004/0252655 A1 | 12/2004 | Lim et al. |
| 2004/0252662 A1 | 12/2004 | Cho |
| 2004/0257979 A1 | 12/2004 | Ro et al. |
| 2004/0264507 A1 | 12/2004 | Cho et al. |
| 2004/0264585 A1 | 12/2004 | Borran et al. |
| 2004/0264593 A1 | 12/2004 | Shim et al. |
| 2005/0002412 A1 | 1/2005 | Sagfors et al. |
| 2005/0002440 A1 | 1/2005 | Alamouti et al. |
| 2005/0002467 A1 | 1/2005 | Seo et al. |
| 2005/0002468 A1 | 1/2005 | Walton et al. |
| 2005/0003782 A1 | 1/2005 | Wintzell |
| 2005/0008091 A1 | 1/2005 | Boutros et al. |
| 2005/0009486 A1 | 1/2005 | Al-Dhahir et al. |
| 2005/0013263 A1 | 1/2005 | Kim et al. |
| 2005/0025093 A1 | 2/2005 | Yun et al. |
| 2005/0030886 A1 | 2/2005 | Wu et al. |
| 2005/0030964 A1 | 2/2005 | Tiedemann, Jr. et al. |
| 2005/0034079 A1 | 2/2005 | Gunasekar et al. |
| 2005/0041611 A1 | 2/2005 | Sandhu et al. |
| 2005/0041618 A1 | 2/2005 | Wei et al. |
| 2005/0041750 A1 | 2/2005 | Lau et al. |
| 2005/0041775 A1 | 2/2005 | Batzinger et al. |
| 2005/0044206 A1 | 2/2005 | Johansson et al. |
| 2005/0047517 A1 | 3/2005 | Georgios et al. |
| 2005/0052991 A1 | 3/2005 | Kadous et al. |
| 2005/0053081 A1 | 3/2005 | Andersson et al. |
| 2005/0053151 A1 | 3/2005 | Lin et al. |
| 2005/0063298 A1 | 3/2005 | Ling et al. |
| 2005/0068921 A1 | 3/2005 | Liu |
| 2005/0073976 A1 | 4/2005 | Fujii et al. |
| 2005/0084000 A1 | 4/2005 | Krauss et al. |
| 2005/0085195 A1 | 4/2005 | Tong et al. |
| 2005/0085197 A1 | 4/2005 | Laroia et al. |
| 2005/0085236 A1 | 4/2005 | Gerlach et al. |
| 2005/0111397 A1 | 5/2005 | Attar et al. |
| 2005/0113100 A1 | 5/2005 | Oprescu-Surcobe et al. |
| 2005/0122898 A1 | 6/2005 | Jang et al. |
| 2005/0128683 A1 | 6/2005 | Watanabe et al. |
| 2005/0128983 A1 | 6/2005 | Kim et al. |
| 2005/0135324 A1 | 6/2005 | Kim et al. |
| 2005/0135498 A1 | 6/2005 | Yee |
| 2005/0141624 A1 | 6/2005 | Lakshmipathi et al. |
| 2005/0147024 A1 | 7/2005 | Jung et al. |
| 2005/0147025 A1 | 7/2005 | Auer et al. |
| 2005/0152484 A1 | 7/2005 | Sandhu et al. |
| 2005/0157807 A1 | 7/2005 | Shim et al. |
| 2005/0159162 A1 | 7/2005 | Park |
| 2005/0164709 A1 | 7/2005 | Balasubramanian et al. |
| 2005/0165949 A1 | 7/2005 | Teague |
| 2005/0174981 A1 | 8/2005 | Heath, Jr. et al. |
| 2005/0175070 A1 | 8/2005 | Grob et al. |
| 2005/0180311 A1 | 8/2005 | Wang et al. |
| 2005/0180313 A1 | 8/2005 | Kim et al. |
| 2005/0181799 A1 | 8/2005 | Laroia et al. |
| 2005/0192011 A1 | 9/2005 | Hong et al. |
| 2005/0195733 A1 | 9/2005 | Walton et al. |
| 2005/0195852 A1 | 9/2005 | Vayanos et al. |
| 2005/0195886 A1 | 9/2005 | Lampinen et al. |
| 2005/0201296 A1 | 9/2005 | Vannithamby et al. |
| 2005/0204247 A1 | 9/2005 | Guo et al. |
| 2005/0207367 A1 | 9/2005 | Onggosanusi et al. |
| 2005/0215196 A1 | 9/2005 | Krishnan et al. |
| 2005/0215251 A1 | 9/2005 | Krishnan et al. |
| 2005/0226204 A1 | 10/2005 | Uehara et al. |
| 2005/0239465 A1 | 10/2005 | Lee et al. |
| 2005/0243791 A1 | 11/2005 | Park et al. |
| 2005/0246548 A1 | 11/2005 | Laitinen |
| 2005/0249266 A1 | 11/2005 | Brown et al. |
| 2005/0254416 A1 | 11/2005 | Laroia et al. |
| 2005/0254467 A1 | 11/2005 | Li et al. |
| 2005/0254477 A1 | 11/2005 | Lee et al. |
| 2005/0254556 A1 | 11/2005 | Fujii et al. |
| 2005/0259005 A1 | 11/2005 | Chiang et al. |
| 2005/0259723 A1 | 11/2005 | Blanchard et al. |
| 2005/0259757 A1 | 11/2005 | Wu et al. |
| 2005/0265220 A1 | 12/2005 | Erlich et al. |
| 2005/0265293 A1 | 12/2005 | Ro et al. |
| 2005/0265470 A1 | 12/2005 | Kishigami et al. |
| 2005/0271012 A1 | 12/2005 | Agrawal et al. |
| 2005/0276347 A1 | 12/2005 | Mujtaba et al. |
| 2005/0276348 A1 | 12/2005 | Vandenameele |
| 2005/0277423 A1 | 12/2005 | Sandhu et al. |
| 2005/0281029 A1 | 12/2005 | Inamoto et al. |
| 2005/0281290 A1 | 12/2005 | Khandekar et al. |
| 2005/0282500 A1 | 12/2005 | Wang et al. |
| 2005/0286408 A1 | 12/2005 | Jin et al. |
| 2005/0289256 A1 | 12/2005 | Cudak et al. |
| 2006/0002451 A1 | 1/2006 | Fukuta et al. |
| 2006/0013285 A1 | 1/2006 | Kobayashi et al. |
| 2006/0018336 A1 | 1/2006 | Sutivong et al. |
| 2006/0018347 A1 | 1/2006 | Agrawal et al. |
| 2006/0018397 A1 | 1/2006 | Sampath et al. |
| 2006/0026344 A1 | 2/2006 | Sun Hsu et al. |
| 2006/0029289 A1 | 2/2006 | Yamaguchi et al. |
| 2006/0034164 A1 | 2/2006 | Ozluturk et al. |
| 2006/0034173 A1 | 2/2006 | Teague et al. |

(56) References Cited

U.S. PATENT DOCUMENTS

| | | |
|---|---|---|
| 2006/0039332 A1 | 2/2006 | Kotzin |
| 2006/0039344 A1 | 2/2006 | Khan |
| 2006/0039500 A1 | 2/2006 | Yun et al. |
| 2006/0040655 A1 | 2/2006 | Kim et al. |
| 2006/0045003 A1 | 3/2006 | Choi et al. |
| 2006/0050770 A1 | 3/2006 | Wallace et al. |
| 2006/0056340 A1 | 3/2006 | Hottinen et al. |
| 2006/0057958 A1 | 3/2006 | Ngo et al. |
| 2006/0067421 A1 | 3/2006 | Walton et al. |
| 2006/0078075 A1 | 4/2006 | Stamoulis et al. |
| 2006/0083159 A1 | 4/2006 | Laroia et al. |
| 2006/0083183 A1 | 4/2006 | Teague et al. |
| 2006/0089104 A1 | 4/2006 | Kaikkonen et al. |
| 2006/0092054 A1* | 5/2006 | Li et al. ............ 341/67 |
| 2006/0093065 A1 | 5/2006 | Thomas et al. |
| 2006/0104333 A1 | 5/2006 | Rainbolt et al. |
| 2006/0104381 A1 | 5/2006 | Menon et al. |
| 2006/0107171 A1 | 5/2006 | Skraparlis |
| 2006/0109814 A1 | 5/2006 | Kuzminskiy et al. |
| 2006/0111054 A1 | 5/2006 | Pan et al. |
| 2006/0111148 A1 | 5/2006 | Mukkavilli et al. |
| 2006/0114858 A1 | 6/2006 | Walton et al. |
| 2006/0120469 A1 | 6/2006 | Maltsev et al. |
| 2006/0120471 A1 | 6/2006 | Learned et al. |
| 2006/0126491 A1 | 6/2006 | Ro et al. |
| 2006/0133269 A1 | 6/2006 | Prakash et al. |
| 2006/0133455 A1 | 6/2006 | Agrawal et al. |
| 2006/0133521 A1 | 6/2006 | Sampath et al. |
| 2006/0140289 A1 | 6/2006 | Mandyam et al. |
| 2006/0153239 A1 | 7/2006 | Julian et al. |
| 2006/0155534 A1* | 7/2006 | Lin et al. ............ 704/223 |
| 2006/0156199 A1 | 7/2006 | Palanki et al. |
| 2006/0172704 A1 | 8/2006 | Nishio et al. |
| 2006/0189321 A1 | 8/2006 | Oh et al. |
| 2006/0203794 A1 | 9/2006 | Sampath et al. |
| 2006/0203891 A1 | 9/2006 | Sampath et al. |
| 2006/0203932 A1 | 9/2006 | Palanki et al. |
| 2006/0209670 A1 | 9/2006 | Gorokhov et al. |
| 2006/0209732 A1 | 9/2006 | Gorokhov et al. |
| 2006/0209754 A1 | 9/2006 | Ji et al. |
| 2006/0209764 A1* | 9/2006 | Kim et al. ............ 370/334 |
| 2006/0209973 A1 | 9/2006 | Gorokhov et al. |
| 2006/0215777 A1 | 9/2006 | Krishnamoorthi |
| 2006/0218459 A1 | 9/2006 | Hedberg |
| 2006/0223449 A1 | 10/2006 | Sampath et al. |
| 2006/0233124 A1 | 10/2006 | Palanki et al. |
| 2006/0233131 A1 | 10/2006 | Gore et al. |
| 2006/0233222 A1 | 10/2006 | Reial et al. |
| 2006/0262754 A1 | 11/2006 | Andersson et al. |
| 2006/0270427 A1 | 11/2006 | Shida et al. |
| 2006/0274836 A1 | 12/2006 | Sampath et al. |
| 2006/0280114 A1 | 12/2006 | Osseiran et al. |
| 2006/0285485 A1 | 12/2006 | Agrawal et al. |
| 2006/0285515 A1 | 12/2006 | Julian et al. |
| 2006/0286974 A1 | 12/2006 | Gore et al. |
| 2006/0286982 A1 | 12/2006 | Prakash et al. |
| 2006/0286995 A1 | 12/2006 | Onggosanusi et al. |
| 2006/0291371 A1 | 12/2006 | Sutivong et al. |
| 2006/0292989 A1 | 12/2006 | Gerlach et al. |
| 2007/0004430 A1 | 1/2007 | Hyun et al. |
| 2007/0005749 A1 | 1/2007 | Sampath |
| 2007/0009011 A1 | 1/2007 | Coulson |
| 2007/0019596 A1 | 1/2007 | Barriac et al. |
| 2007/0025345 A1 | 2/2007 | Bachl et al. |
| 2007/0041311 A1 | 2/2007 | Baum et al. |
| 2007/0041404 A1 | 2/2007 | Palanki et al. |
| 2007/0041457 A1 | 2/2007 | Kadous et al. |
| 2007/0047485 A1 | 3/2007 | Gorokhov et al. |
| 2007/0047495 A1 | 3/2007 | Ji et al. |
| 2007/0049218 A1 | 3/2007 | Gorokhov et al. |
| 2007/0053282 A1 | 3/2007 | Tong et al. |
| 2007/0053383 A1 | 3/2007 | Choi et al. |
| 2007/0060178 A1 | 3/2007 | Gorokhov et al. |
| 2007/0064669 A1 | 3/2007 | Classon et al. |
| 2007/0070952 A1 | 3/2007 | Yoon et al. |
| 2007/0071147 A1 | 3/2007 | Sampath et al. |
| 2007/0097853 A1 | 5/2007 | Khandekar et al. |
| 2007/0097889 A1 | 5/2007 | Wang et al. |
| 2007/0097897 A1 | 5/2007 | Teague et al. |
| 2007/0097908 A1 | 5/2007 | Khandekar et al. |
| 2007/0097909 A1 | 5/2007 | Khandekar et al. |
| 2007/0097910 A1 | 5/2007 | Ji et al. |
| 2007/0097922 A1 | 5/2007 | Parekh et al. |
| 2007/0097927 A1 | 5/2007 | Gorokhov et al. |
| 2007/0097942 A1 | 5/2007 | Gorokhov et al. |
| 2007/0097981 A1 | 5/2007 | Papasakellariou et al. |
| 2007/0098050 A1 | 5/2007 | Khandekar et al. |
| 2007/0098120 A1 | 5/2007 | Wang et al. |
| 2007/0099666 A1 | 5/2007 | Astely et al. |
| 2007/0110172 A1 | 5/2007 | Faulkner et al. |
| 2007/0115795 A1 | 5/2007 | Gore et al. |
| 2007/0149194 A1 | 6/2007 | Das et al. |
| 2007/0149228 A1 | 6/2007 | Das |
| 2007/0159969 A1 | 7/2007 | Das et al. |
| 2007/0160115 A1 | 7/2007 | Palanki et al. |
| 2007/0165738 A1 | 7/2007 | Barriac et al. |
| 2007/0177631 A1 | 8/2007 | Popovic et al. |
| 2007/0177681 A1* | 8/2007 | Choi et al. ............ 375/260 |
| 2007/0183303 A1 | 8/2007 | Pi et al. |
| 2007/0183386 A1 | 8/2007 | Muharemovic et al. |
| 2007/0207812 A1 | 9/2007 | Borran et al. |
| 2007/0211616 A1 | 9/2007 | Khandekar et al. |
| 2007/0211667 A1 | 9/2007 | Agrawal et al. |
| 2007/0230324 A1 | 10/2007 | Li et al. |
| 2007/0242653 A1 | 10/2007 | Yang et al. |
| 2007/0263743 A1 | 11/2007 | Lee et al. |
| 2007/0280336 A1 | 12/2007 | Zhang et al. |
| 2007/0281702 A1 | 12/2007 | Lim et al. |
| 2008/0039129 A1 | 2/2008 | Li et al. |
| 2008/0063099 A1 | 3/2008 | Laroia et al. |
| 2008/0095223 A1 | 4/2008 | Tong et al. |
| 2008/0095262 A1 | 4/2008 | Ho et al. |
| 2008/0151829 A1 | 6/2008 | Khandekar et al. |
| 2008/0181139 A1 | 7/2008 | Rangarajan et al. |
| 2008/0214222 A1 | 9/2008 | Atarashi et al. |
| 2008/0253279 A1 | 10/2008 | Ma et al. |
| 2008/0267157 A1 | 10/2008 | Lee et al. |
| 2008/0299983 A1 | 12/2008 | Kwak et al. |
| 2009/0003466 A1 | 1/2009 | Taherzadehboroujeni et al. |
| 2009/0010351 A1 | 1/2009 | Laroia et al. |
| 2009/0022098 A1 | 1/2009 | Novak et al. |
| 2009/0041150 A1 | 2/2009 | Tsai et al. |
| 2009/0110103 A1 | 4/2009 | Maltsev et al. |
| 2009/0129501 A1 | 5/2009 | Mehta et al. |
| 2009/0180459 A1 | 7/2009 | Orlik et al. |
| 2009/0197646 A1 | 8/2009 | Tamura et al. |
| 2009/0201826 A1 | 8/2009 | Gorokhov et al. |
| 2009/0201872 A1 | 8/2009 | Gorokhov et al. |
| 2009/0213750 A1 | 8/2009 | Gorokhov et al. |
| 2009/0213950 A1 | 8/2009 | Gorokhov et al. |
| 2009/0262641 A1 | 10/2009 | Laroia et al. |
| 2009/0262699 A1 | 10/2009 | Wengerter et al. |
| 2009/0285163 A1 | 11/2009 | Zhang et al. |
| 2009/0287977 A1 | 11/2009 | Chang et al. |
| 2010/0002570 A9 | 1/2010 | Walton et al. |
| 2010/0135242 A1 | 6/2010 | Nam et al. |
| 2010/0220800 A1 | 9/2010 | Erell et al. |
| 2010/0232384 A1 | 9/2010 | Farajidana et al. |
| 2010/0238902 A1 | 9/2010 | Ji et al. |
| 2010/0254263 A1 | 10/2010 | Chen et al. |
| 2011/0064070 A1 | 3/2011 | Gore et al. |
| 2011/0235733 A1 | 9/2011 | Laroia et al. |
| 2011/0235745 A1 | 9/2011 | Laroia et al. |
| 2011/0235746 A1 | 9/2011 | Laroia et al. |
| 2011/0235747 A1 | 9/2011 | Laroia et al. |
| 2011/0306291 A1 | 12/2011 | Ma et al. |
| 2012/0002623 A1 | 1/2012 | Khandekar et al. |
| 2012/0063441 A1 | 3/2012 | Palanki |
| 2012/0120925 A1 | 5/2012 | Kadous et al. |
| 2012/0140798 A1 | 6/2012 | Kadous et al. |
| 2012/0140838 A1 | 6/2012 | Kadous et al. |
| 2013/0016678 A1 | 1/2013 | Laroia et al. |
| 2013/0208681 A1 | 8/2013 | Gore et al. |
| 2013/0287138 A1 | 10/2013 | Ma et al. |

(56) References Cited

U.S. PATENT DOCUMENTS

| | | |
|---|---|---|
| 2013/0315200 A1 | 11/2013 | Gorokhov et al. |
| 2014/0247898 A1 | 9/2014 | Laroia et al. |
| 2014/0376518 A1 | 12/2014 | Palanki et al. |

FOREIGN PATENT DOCUMENTS

| | | |
|---|---|---|
| CA | 2540688 | 5/2005 |
| CA | 2577369 | 3/2006 |
| CL | 19931400 | 12/1994 |
| CL | 1997846 | 1/1998 |
| CL | 27102004 | 8/2005 |
| CL | 22892004 | 9/2005 |
| CL | 30862004 | 10/2005 |
| CL | 29932005 | 5/2006 |
| CL | 15212006 | 3/2007 |
| CL | 14922006 | 4/2007 |
| CL | 14892006 | 5/2007 |
| CL | 14902006 | 5/2007 |
| CL | 46151 | 12/2009 |
| CN | 1252919 | 5/2000 |
| CN | 1267437 | 9/2000 |
| CN | 1284795 | 2/2001 |
| CN | 1296682 | 5/2001 |
| CN | 1344451 | 4/2002 |
| CN | 1346221 | 4/2002 |
| CN | 1383631 | 12/2002 |
| CN | 1386344 | 12/2002 |
| CN | 1402916 A | 3/2003 |
| CN | 1424835 | 6/2003 |
| CN | 1132474 C | 12/2003 |
| CN | 1467938 A | 1/2004 |
| CN | 1487755 A | 4/2004 |
| CN | 1520220 | 8/2004 |
| CN | 1525678 | 9/2004 |
| CN | 1642051 A | 7/2005 |
| CN | 1642335 A | 7/2005 |
| CN | 1647436 A | 7/2005 |
| DE | 19800653 A1 | 7/1999 |
| DE | 19800953 C1 | 7/1999 |
| DE | 19957288 C1 | 5/2001 |
| DE | 10240138 | 8/2003 |
| DE | 10254384 A1 | 6/2004 |
| EP | 0488976 A2 | 6/1992 |
| EP | 0568291 A2 | 11/1993 |
| EP | 0740431 A1 | 10/1996 |
| EP | 0786889 A1 | 7/1997 |
| EP | 0805576 A2 | 11/1997 |
| EP | 0807989 | 11/1997 |
| EP | 0844796 A2 | 5/1998 |
| EP | 0981222 A2 | 2/2000 |
| EP | 1001570 A2 | 5/2000 |
| EP | 1061687 A1 | 12/2000 |
| EP | 1091516 A1 | 4/2001 |
| EP | 1093241 | 4/2001 |
| EP | 1148673 A2 | 10/2001 |
| EP | 1172983 A2 | 1/2002 |
| EP | 1180907 A2 | 2/2002 |
| EP | 1187506 A1 | 3/2002 |
| EP | 1204217 A1 | 5/2002 |
| EP | 1255369 A1 | 11/2002 |
| EP | 1267513 A2 | 12/2002 |
| EP | 1074099 B1 | 2/2003 |
| EP | 1286490 A2 | 2/2003 |
| EP | 1335504 | 8/2003 |
| EP | 1351538 A1 | 10/2003 |
| EP | 1376920 A1 | 1/2004 |
| EP | 1392073 A1 | 2/2004 |
| EP | 1434365 | 6/2004 |
| EP | 1441469 | 7/2004 |
| EP | 1445873 A2 | 8/2004 |
| EP | 1465449 A1 | 10/2004 |
| EP | 1478204 A2 | 11/2004 |
| EP | 1507421 A1 | 2/2005 |
| EP | 1513356 A2 | 3/2005 |
| EP | 1531575 A2 | 5/2005 |
| EP | 1533950 A1 | 5/2005 |
| EP | 1538863 A1 | 6/2005 |
| EP | 1542488 A1 | 6/2005 |
| EP | 1601149 A2 | 11/2005 |
| EP | 1643669 A1 | 4/2006 |
| EP | 1898542 A1 | 3/2008 |
| EP | 1941693 | 7/2011 |
| FR | 2584884 A1 | 1/1987 |
| GB | 2279540 | 1/1995 |
| GB | 2348776 A | 10/2000 |
| GB | 2412541 | 9/2005 |
| GB | 2412541 A | 9/2005 |
| IL | 167573 | 2/2011 |
| IL | 201872 | 5/2012 |
| JP | H04111544 A | 4/1992 |
| JP | 4301931 | 10/1992 |
| JP | H0746248 A | 2/1995 |
| JP | 7336323 A | 12/1995 |
| JP | 8116329 A | 5/1996 |
| JP | O8288927 | 11/1996 |
| JP | 9008725 A | 1/1997 |
| JP | H09501548 A | 2/1997 |
| JP | 9131342 | 5/1997 |
| JP | 9182148 A | 7/1997 |
| JP | 09214404 | 8/1997 |
| JP | 9284200 A | 10/1997 |
| JP | 10117162 | 5/1998 |
| JP | H10210000 A | 8/1998 |
| JP | 10322304 | 12/1998 |
| JP | H11168453 A | 6/1999 |
| JP | 11191756 A | 7/1999 |
| JP | 11196109 | 7/1999 |
| JP | 11508417 T | 7/1999 |
| JP | 11239155 A | 8/1999 |
| JP | 11298954 | 10/1999 |
| JP | 11331927 A | 11/1999 |
| JP | 2000022618 A | 1/2000 |
| JP | 2000102065 A | 4/2000 |
| JP | 2000184425 | 6/2000 |
| JP | 2000511750 A | 9/2000 |
| JP | 2000332724 A | 11/2000 |
| JP | 2001016644 A2 | 1/2001 |
| JP | 2001045573 A | 2/2001 |
| JP | 2001057545 A | 2/2001 |
| JP | 2001156732 A | 6/2001 |
| JP | 2001238269 | 8/2001 |
| JP | 2001245355 A | 9/2001 |
| JP | 2001249802 | 9/2001 |
| JP | 2001285927 A | 10/2001 |
| JP | 2001521698 A | 11/2001 |
| JP | 2001526012 | 12/2001 |
| JP | 2002026790 | 1/2002 |
| JP | 2002111556 A | 4/2002 |
| JP | 2002515203 T | 5/2002 |
| JP | 2002290148 A | 10/2002 |
| JP | 2002534925 A | 10/2002 |
| JP | 2002534941 | 10/2002 |
| JP | 2002538696 A | 11/2002 |
| JP | 200318054 | 1/2003 |
| JP | 2003032218 | 1/2003 |
| JP | 2003500909 | 1/2003 |
| JP | 200369472 | 3/2003 |
| JP | 2003101515 | 4/2003 |
| JP | 2003169367 A | 6/2003 |
| JP | 2003174426 | 6/2003 |
| JP | 2003199173 A | 7/2003 |
| JP | 2003520523 | 7/2003 |
| JP | 2003235072 A | 8/2003 |
| JP | 2003249907 A | 9/2003 |
| JP | 2003292667 A | 10/2003 |
| JP | 2003318857 A | 11/2003 |
| JP | 2003347985 | 12/2003 |
| JP | 2003348047 | 12/2003 |
| JP | 2003536308 A | 12/2003 |
| JP | 2004007643 A | 1/2004 |
| JP | 2004023716 | 1/2004 |
| JP | 2004048716 | 2/2004 |
| JP | 200472457 | 3/2004 |

(56) References Cited

FOREIGN PATENT DOCUMENTS

| | | |
|---|---|---|
| JP | 2004072157 A | 3/2004 |
| JP | 2004096142 A | 3/2004 |
| JP | 2004507151 A | 3/2004 |
| JP | 2004507950 A | 3/2004 |
| JP | 2004153676 | 5/2004 |
| JP | 2004158901 A | 6/2004 |
| JP | 2004162388 A | 6/2004 |
| JP | 2004194262 A | 7/2004 |
| JP | 2004201296 A | 7/2004 |
| JP | 2004215022 A | 7/2004 |
| JP | 2004221972 | 8/2004 |
| JP | 2004266818 | 9/2004 |
| JP | 2004529524 T | 9/2004 |
| JP | 2004297276 | 10/2004 |
| JP | 2004297370 A | 10/2004 |
| JP | 2004297756 | 10/2004 |
| JP | 2004534456 | 11/2004 |
| JP | 2004535106 | 11/2004 |
| JP | 2005006337 | 1/2005 |
| JP | 2005020530 A | 1/2005 |
| JP | 2005502218 T | 1/2005 |
| JP | 2005506757 | 3/2005 |
| JP | 2005110130 A | 4/2005 |
| JP | 2005130491 A | 5/2005 |
| JP | 2005167502 A | 6/2005 |
| JP | 2005197772 | 7/2005 |
| JP | 2005203961 | 7/2005 |
| JP | 2005521327 | 7/2005 |
| JP | 2005521358 | 7/2005 |
| JP | 2005236678 A | 9/2005 |
| JP | 2006505172 | 2/2006 |
| JP | 2006505230 A | 2/2006 |
| JP | 2006506860 A | 2/2006 |
| JP | 2006211537 A | 8/2006 |
| JP | 2006518173 A | 8/2006 |
| JP | 2006524930 A | 11/2006 |
| JP | 2007500486 A | 1/2007 |
| JP | 2007503790 | 2/2007 |
| JP | 2007519281 | 7/2007 |
| JP | 2007525043 A | 8/2007 |
| JP | 2007527127 | 9/2007 |
| JP | 2008505587 A | 2/2008 |
| JP | 2008535398 | 8/2008 |
| JP | 4188372 B2 | 11/2008 |
| JP | 2008546314 | 12/2008 |
| JP | 04694628 | 6/2011 |
| KR | 0150275 B1 | 11/1998 |
| KR | 20000060428 | 10/2000 |
| KR | 100291476 B1 | 3/2001 |
| KR | 20010056333 | 4/2001 |
| KR | 20010087715 A | 9/2001 |
| KR | 20030007965 | 1/2003 |
| KR | 20030035969 A | 5/2003 |
| KR | 20040063057 A | 7/2004 |
| KR | 200471652 | 8/2004 |
| KR | 20040103441 | 12/2004 |
| KR | 20040103441 A | 12/2004 |
| KR | 20050063826 A | 6/2005 |
| KR | 100606099 | 7/2006 |
| RU | 95121152 | 12/1997 |
| RU | 2141168 | 11/1999 |
| RU | 2141706 | 11/1999 |
| RU | 2159007 C2 | 11/2000 |
| RU | 2162275 C2 | 1/2001 |
| RU | 2183387 C2 | 6/2002 |
| RU | 2192094 C1 | 10/2002 |
| RU | 2197778 C2 | 1/2003 |
| RU | 2201033 C2 | 3/2003 |
| RU | 2207723 | 6/2003 |
| RU | 2207723 C1 | 6/2003 |
| RU | 2208913 | 7/2003 |
| RU | 2210866 C2 | 8/2003 |
| RU | 2216101 C2 | 11/2003 |
| RU | 2216103 C2 | 11/2003 |
| RU | 2216105 C2 | 11/2003 |
| RU | 2225080 C2 | 2/2004 |
| RU | 2235429 | 8/2004 |
| RU | 2235432 | 8/2004 |
| RU | 2237379 | 9/2004 |
| RU | 2238611 C1 | 10/2004 |
| RU | 2242091 C2 | 12/2004 |
| RU | 2250564 | 4/2005 |
| RU | 2257008 | 7/2005 |
| RU | 2267224 | 12/2005 |
| RU | 2005129079 | 2/2006 |
| RU | 2285338 C2 | 10/2006 |
| RU | 2285351 C2 | 10/2006 |
| RU | 2292655 | 1/2007 |
| RU | 2005106258 | 10/2008 |
| RU | 2349043 C2 | 3/2009 |
| SU | 1320883 | 6/1987 |
| TW | 508960 | 11/2002 |
| TW | 508960 B | 11/2002 |
| TW | 510132 | 11/2002 |
| TW | 200302642 | 8/2003 |
| TW | 200401572 | 1/2004 |
| TW | I232040 | 5/2005 |
| TW | 248266 | 1/2006 |
| TW | 200718128 | 5/2007 |
| WO | WO9408432 A1 | 4/1994 |
| WO | WO-9521494 A1 | 8/1995 |
| WO | WO9613920 A1 | 5/1996 |
| WO | WO9701256 | 1/1997 |
| WO | WO9737456 A2 | 10/1997 |
| WO | WO-9746033 A2 | 12/1997 |
| WO | WO-9800946 A2 | 1/1998 |
| WO | WO-9814026 A1 | 4/1998 |
| WO | WO9837706 A2 | 8/1998 |
| WO | WO9848581 A1 | 10/1998 |
| WO | WO9853561 | 11/1998 |
| WO | WO9854919 A2 | 12/1998 |
| WO | WO-9941871 A1 | 8/1999 |
| WO | WO-9944313 A1 | 9/1999 |
| WO | WO-9944383 A1 | 9/1999 |
| WO | WO-9952250 A1 | 10/1999 |
| WO | WO9953713 | 10/1999 |
| WO | WO-9959265 A1 | 11/1999 |
| WO | WO9960729 A1 | 11/1999 |
| WO | 0004728 | 1/2000 |
| WO | WO0002397 | 1/2000 |
| WO | WO0033503 | 6/2000 |
| WO | 0041542 | 7/2000 |
| WO | 0051389 A1 | 8/2000 |
| WO | WO0070897 | 11/2000 |
| WO | WO0101596 | 1/2001 |
| WO | WO0117125 A1 | 3/2001 |
| WO | WO0126269 | 4/2001 |
| WO | WO-0139523 A2 | 5/2001 |
| WO | WO0145300 | 6/2001 |
| WO | WO-0148969 A2 | 7/2001 |
| WO | WO-0158054 A1 | 8/2001 |
| WO | WO-0160106 A1 | 8/2001 |
| WO | 0165637 A2 | 9/2001 |
| WO | WO0169814 A1 | 9/2001 |
| WO | WO0182543 A2 | 11/2001 |
| WO | WO-0182544 A2 | 11/2001 |
| WO | WO-0189112 A1 | 11/2001 |
| WO | 0195427 A2 | 12/2001 |
| WO | WO0193505 | 12/2001 |
| WO | WO-0204936 A1 | 1/2002 |
| WO | WO0207375 | 1/2002 |
| WO | 0215432 A1 | 2/2002 |
| WO | WO0215616 | 2/2002 |
| WO | WO-0219746 A1 | 3/2002 |
| WO | WO-0231991 A2 | 4/2002 |
| WO | WO-0233848 A2 | 4/2002 |
| WO | 0245293 A2 | 6/2002 |
| WO | WO0245456 A1 | 6/2002 |
| WO | WO0249305 | 6/2002 |
| WO | WO-0249306 A2 | 6/2002 |
| WO | WO0249385 A2 | 6/2002 |
| WO | WO02060138 A2 | 8/2002 |
| WO | WO02065675 | 8/2002 |
| WO | WO02082689 A2 | 10/2002 |

(56) References Cited

FOREIGN PATENT DOCUMENTS

| WO | WO-02082743 A2 | 10/2002 |
|---|---|---|
| WO | WO02089434 A1 | 11/2002 |
| WO | WO02093782 A1 | 11/2002 |
| WO | WO02093819 | 11/2002 |
| WO | WO02100027 A1 | 12/2002 |
| WO | WO03001696 A2 | 1/2003 |
| WO | WO-03001696 A2 | 1/2003 |
| WO | WO03001761 A1 | 1/2003 |
| WO | WO-03001981 A2 | 1/2003 |
| WO | WO-03003617 A2 | 1/2003 |
| WO | WO03019819 | 3/2003 |
| WO | WO03030414 A1 | 4/2003 |
| WO | WO03034644 A1 | 4/2003 |
| WO | WO03043262 A1 | 5/2003 |
| WO | WO03043369 | 5/2003 |
| WO | 03049409 A2 | 6/2003 |
| WO | WO03058871 A1 | 7/2003 |
| WO | 03069816 A2 | 8/2003 |
| WO | WO03067783 | 8/2003 |
| WO | WO03069832 | 8/2003 |
| WO | WO03073646 | 9/2003 |
| WO | WO03075479 A1 | 9/2003 |
| WO | WO03085876 | 10/2003 |
| WO | WO03088538 A1 | 10/2003 |
| WO | WO03094384 | 11/2003 |
| WO | WO03103331 | 12/2003 |
| WO | WO2004002047 | 12/2003 |
| WO | WO2004008671 | 1/2004 |
| WO | WO-2004008681 A1 | 1/2004 |
| WO | WO2004084509 | 1/2004 |
| WO | WO2004015912 | 2/2004 |
| WO | WO2004016007 | 2/2004 |
| WO | WO2004021605 A1 | 3/2004 |
| WO | WO2004023834 A1 | 3/2004 |
| WO | 2004028037 A1 | 4/2004 |
| WO | WO-2004030238 A1 | 4/2004 |
| WO | WO-2004032443 A1 | 4/2004 |
| WO | 2004038984 A2 | 5/2004 |
| WO | WO2004038954 | 5/2004 |
| WO | WO-2004038972 A1 | 5/2004 |
| WO | WO-2004038988 A2 | 5/2004 |
| WO | WO-2004040690 A2 | 5/2004 |
| WO | WO-2004040827 A2 | 5/2004 |
| WO | WO2004047354 A1 | 6/2004 |
| WO | WO2004049618 A1 | 6/2004 |
| WO | WO-2004051872 A2 | 6/2004 |
| WO | 2004056022 A2 | 7/2004 |
| WO | WO2004062255 A1 | 7/2004 |
| WO | WO2004064294 | 7/2004 |
| WO | WO2004064295 | 7/2004 |
| WO | WO2004066520 | 8/2004 |
| WO | WO2004068721 A2 | 8/2004 |
| WO | WO-2004073276 A1 | 8/2004 |
| WO | WO2004075023 | 9/2004 |
| WO | WO2004075442 | 9/2004 |
| WO | WO2004075448 | 9/2004 |
| WO | WO2004075468 | 9/2004 |
| WO | WO2004075596 | 9/2004 |
| WO | WO2004077850 A2 | 9/2004 |
| WO | WO2004084509 | 9/2004 |
| WO | WO-2004086706 A1 | 10/2004 |
| WO | WO-2004086711 A1 | 10/2004 |
| WO | 2004095851 | 11/2004 |
| WO | 2004098072 | 11/2004 |
| WO | WO2004095730 A1 | 11/2004 |
| WO | WO2004095854 | 11/2004 |
| WO | WO2004098222 | 11/2004 |
| WO | WO2004102815 | 11/2004 |
| WO | 2004114564 A1 | 12/2004 |
| WO | 2004114615 A1 | 12/2004 |
| WO | WO2004105272 A1 | 12/2004 |
| WO | WO2004114549 | 12/2004 |
| WO | WO2005002253 A1 | 1/2005 |
| WO | WO2005011163 A1 | 2/2005 |
| WO | WO-2005015795 A1 | 2/2005 |
| WO | WO-2005015797 A1 | 2/2005 |
| WO | WO2005015810 | 2/2005 |
| WO | WO-2005015941 A2 | 2/2005 |
| WO | WO2005020488 A1 | 3/2005 |
| WO | WO2005020490 | 3/2005 |
| WO | WO2005022811 | 3/2005 |
| WO | WO2005025110 A2 | 3/2005 |
| WO | WO2005032004 A1 | 4/2005 |
| WO | 2005043780 A1 | 5/2005 |
| WO | WO2005043855 | 5/2005 |
| WO | WO2005046080 | 5/2005 |
| WO | 2005055465 A1 | 6/2005 |
| WO | WO2005055484 A1 | 6/2005 |
| WO | WO-2005055527 A1 | 6/2005 |
| WO | WO-2005065062 A2 | 7/2005 |
| WO | WO-2005069538 A1 | 7/2005 |
| WO | WO2005074184 | 8/2005 |
| WO | 2005086440 A1 | 9/2005 |
| WO | WO-2005096538 A1 | 10/2005 |
| WO | WO2005122628 | 12/2005 |
| WO | 2006007292 A2 | 1/2006 |
| WO | WO2006019710 | 2/2006 |
| WO | WO-2006026344 A1 | 3/2006 |
| WO | WO2006044487 | 4/2006 |
| WO | 2006062356 A1 | 6/2006 |
| WO | WO2006069300 | 6/2006 |
| WO | WO2006069397 | 6/2006 |
| WO | WO2006077696 | 7/2006 |
| WO | WO-2006096784 A1 | 9/2006 |
| WO | WO-2006099349 A1 | 9/2006 |
| WO | WO-2006099545 A1 | 9/2006 |
| WO | WO-2006099577 A1 | 9/2006 |
| WO | WO-2006127544 A2 | 11/2006 |
| WO | WO-2006134032 A1 | 12/2006 |
| WO | WO-2006138196 A1 | 12/2006 |
| WO | WO-2006138573 A2 | 12/2006 |
| WO | WO2006138581 A2 | 12/2006 |
| WO | 2007022430 A2 | 2/2007 |
| WO | WO-2007024934 A2 | 3/2007 |
| WO | WO-2007024935 A2 | 3/2007 |
| WO | WO2007025160 | 3/2007 |
| WO | WO-2007051159 A2 | 5/2007 |

OTHER PUBLICATIONS

International Preliminary Report on Patentability—PCT/US2006/010962, International Bureau of WIPO—Oct. 4, 2007.
Written Opinion—PCT/US2006/010962, International Search Authority—European Patent Office—Aug. 4, 2006.
Lau, et al., "On the Design of MIMO Block-Fading Channels with Feedback-Link Capacity Constraint," IEEE Transactions on Communications. IEEE Service Center. Piscataway, NJ. US. v. 52. No. 1. Jan. 2004, pp. 62-70, XP001189908.
European Search Report—EP10011743. Search Authority—Munich Patent Office, Dec. 20, 2010.
European Search Report—EP10012081, Search Authority—Munich Patent Office, Dec. 17, 2010.
European Search Report—EP10012082, Search Authority—Munich Patent Office, Dec. 20, 2010.
European Search Report—EP10012083, Search Authority—Munich Patent Office, Dec. 30, 2019.
Groe, J. et al.: "CDMA Mobile Radio Design," Sep. 26, 2001, Artech House, Inc. Norwood, MA, pp. 257-259.
Maniatis, I. et al., "Pilots for joint channel estimation in multi-user OFDM mobile radio systems," 2002 IEEE Seventh International Symposium on Spread Spectrum Techniques and Applications, Prague, Czech Republic, Sep. 2, 2002, pp. 44-48, XP010615562.
Sumii, Kenji et al.; "A Study on Computational Complexity Reduction of Iterative Decoding for Turbo-coded MIMO-SDM Using Sphere Decoding," Technical Report of IEICE. RCS, Nov. 9, 2010, vol. 104, No. 675, pp. 43-48.
Taiwanese Search Report—095139893—TIPO—Dec. 30, 2010.
Tomcik, Jim: "QFDD Technology Overview Presentation," IEEE 802.20 Working Group on Mobile Broadband Wireless Access, [Online] Nov. 15, 2005, pp. 1-73, XP002467626.
Translation of Office Action in Chinese Application 2006800295980 corresponding to U.S. Appl. No. 11/260,895, citing CN1346221 and CN1383631 dated Feb. 16, 2011.

(56) References Cited

OTHER PUBLICATIONS

Translation of Office Action in Korean application 10-2007-7031029 corresponding to U.S. Appl. No. 11/260,931, citing US20030202491 and KR20040063057 dated Jan. 28, 2011.
Translation of Office Action in Japanese Application 2008-514880 corresponding to U.S. Appl. No. 11/445,377, citing JP2007519281 and JP2006505172 dated Nov. 9, 2010.
Translation of Office Action in Japanese Application 2008-529216 corresponding to U.S. Appl. No. 11/261,159, citing GB2348776 , WO2004098222, WO2005065062 and WO2004102815.Dated Jan. 11, 2011.
Yongmei Dai,; Sumei Sun; Zhongding Lei; Yuan Li.: "A List Sphere Decoder based turbo receiver for group wise space time trellis coded (GSTTC) systems," 2004 IEEE 59th Vehicular Technology Conference, vol. 2, pp. 804-808, May 17, 2004, doi: 10.1109/VETECS. 2004.1388940.
Blum et al, "On Optimum MIMO with antenna selection," IEEE International Conference on Communications: Conference Proceedings, vol. 1, Apr. 28, 2002, pp. 386-390.
Catreux, S. et al.: "Simulation results for an interference-limited multiple input multiple output cellular system"., Global Telecommunications Conference, 2000. Globecom '00. IEEE. Dec. 1, 2000. vol. 2, pp. 1094-1096 http://ieeexplore.ieee.org/ie15/7153/19260/ 00891306.pdf?tp=&isnumber=19260&arnumber=8913063& punumber=7153.
Chiani, et al. "Outage Evaluation for Slow Frequency-Hopping Mobile Radio Systems" IEEE Transactions on Communications, vol. 47, No. 12, Dec. 1999, pp. 1865-1874.
Chung, S. et al.: "Low complexity algorithm for rate and power quantization in extended V-BLAST" VTC Fall 2001. IEEE 54th. Vehicular Technology Conference Proceedings. Atlantic City, NJ, Oct. 7-11, 2001, vol. 1 of 4, pp. 910-914, Conf. 54.
El Gamal, et al.: "Universal Space-Time Coding," IEEE Transactions on Information Theory, vol. 49, Issue 5, pp. 1097-1119, XP011074756, ISSN: 0018-9448, May 2003.
Hochwald et al., "Achieving near-capacity on a multiple-antenna channel," IEEE Transactions on Communications, IEEE Service Center, Piscataway, New Jersey, vol. 51, No. 3, pp. 389-399 (2003).
Kiessling et al, "Short-term and long-term diagonalization of correlated MIMO channels with adaptive modulation" IEEE International Symposium on Personal, Indoor and Mobile Radio Communications, vol. 2, Sep. 15, 2002, pp. 593-597.
Kousa, M. et al: "Adaptive Binary Coding for Diversity Communication Systems" IEEE International Conference on Personal Wireless Communications Proceedings, pp. 80-84, XP000992269, 1997.
Nokia, "Uplink Considerations for UTRA LTE", 3GPP TSG RAN WG1#40bis, Beijing, CN, R1-050251, 3GPP, Apr. 4, 2005, pp. 1-9.
NTT DoCoMo, "Downlink Multiple Access Scheme for Evolved UTRA", 3GPP R1-050249, 3GPP, Apr. 4, 2005, pp. 1-8.
Prasad, N. et al.: "Analysis of Decision Feedback Detection for MIMO Rayleigh Fading Channels and Optimum Allocation of Transmitter Powers and QAM Constellations," pp. 1-10, 39th Annual Conference on Comm. Control and Comput., Monticello, IL Oct. 2001.
Qualcomm Europe: "Description and link simulations for OFDMA based E-UTRA uplink" 3GPP Draft; R1-051100, 3rd Generation Partnership Project (3GPP), Mobile Competence Centre ; 650, Route Des Lucioles ; F-06921 Sophia-Antipolis Cedex ; France, vol. RAN WG1, no. San Diego, USA; 20051004, Oct. 4, 2005, pp. 1-10, XP050100715.
Schnell et al., "Application of IFDMA to Mobile Radio Transmission", IEEE 1998 International Conference on Universal Personal Communications, vol. 2, Oct. 5-9, 1998, pp. 1267-1272.
Widdup, B. et al., "A highly-parallel VLSI architecture for a list sphere detector," IEEE International Conference, Paris, France, vol. 5, pp. 2720-2725 (2004).
Wiesel, A. et al.: "Efficient implementation of sphere demodulation" Signal Processing Advances in Wireless Communications, 2003. SPAWC 2003. 4th IEEE Workshop on Rome. Italy Jun. 15-18, 2003, Piscataway, NJ, USA, IEEE, US, Jun. 15, 2003, pp. 36-40, XP010713463.
S. Nishimura et al., "Downlink Null-Formation Using Receiving Antenna Selection in MIMO/SDMA", Technical Search Report of Electric Information Communication Academic Conference, Feb. 28, 2002, vol. 101, No. 683, pp. 17-22, RCS 2001-286.
3GPP TS 33.220 V.1.1.0 XX,XX, "3rd Generation Partnership Projects; Technical Specification Group Services and System Aspects; Generic Authentication Architecture (GAA); Generic Bootstrapping Architecture (Release 6)" Feb. 9, 2004, pp. 1-17, figure 4, XP002996023.
Net Working Group, T. Dierks, C. Allen, Certicom; The TLS Protocol Version 1.0; Jan. 1999.
Guo, K. et al.: "Providing end-to-end QoS for multimedia applications in 3G wireless networks," Proceedings vol. 5242, SPIE ITCom 2003 Conf. Internet Multimedia Management Systems IV, Nov. 26, 2003, pp. 1-14, DOI: 10.1117/12.514061.
Tomcik, T.: "QTDD Performance Report 2," IEEE C802.20-05/88, IEEE 802.20 Working Group on Mobile Broadband Wireless Access, <http://ieee802.org/20/>, pp. 1-56, XP002386798 (Nov. 15, 2005).
Translation of Office Action in Japan application 2008-538193 corresponding to U.S. Appl. No. 11/261,065, citing JP11196109, JP10322304 and JP09008725 dated Mar. 8, 2011.
Translation of Office Action in Canadian application 2625987 corresponding to U.S. Appl. No. 11/261,065, citing CA2557369 dated Apr. 12, 2011.
Translation of Office Action in Chinese application 200680040236.1 corresponding to U.S. Appl. No. 11/261,065, citing US20040048609 and CN1402916 dated Feb. 18, 2011.
Translation of Office Action in Chinese application 200680048265.2 corresponding to U.S. Appl. No. 11/260,931, citing US6904097, WO2004095851, CN1344451 dated Jan. 26, 2011.
Translation of Office Action in Chinese application 200680048832.4 corresponding to U.S. Appl. No. 11/261,158, citing CN1132474 dated Dec. 31, 2010.
Translation of Office Action in Japanese application 2008-528103 corresponding to U.S. Appl. No. 11/260,924, citing JP2005502218, JP2004534456, JP2003348047, JP2003199173, JP2004529524, JP11508417, JP2001238269, JP2005130491 and JP2003500909 dated Feb. 8, 2011.
Translation of Office Action in Japanese application 2008-538181 corresponding to U.S. Appl. No. 11/511,735, citing WO04064295, JP2002515203, JP8288927, JP7336323 and JP200157545 dated Jan. 25, 2011.
Voltz, P. J.,"Characterization of the optimum transmitter correlation matrix for MIMO with antenna subset selection", IEEE Transactions on Communications, vol. 51, No. 11, pp. 1779-1782, (Nov. 1, 2003).
Wang et al., "Improving performance of multi-user OFDM systems using bit-wise interleaver" Electronics Letters IEE Stevenage, GB, vol. 37. No. 19, Sep. 13, 2001, pp. 1173-1174 XP006017222.
Yun et al., "Performance of an LDPC-Coded Frequency-Hopping QFDMA System Based on Resource Allocation in the Uplink" Vehicular Technology—Conference 2004. VTO 2004—Spring, 2004 IEEE 59th Milan, Italy May 17-19, 2004, Piscataway, NJ, USA, vol. 4, May 17, 2004. pp. 1925-1928. XP010766497.
B. Sklar: "The process of thus correcting the channel-induced distortion is called equalization", Digital Communications, PTR Prentice Hall, Upper Saddle River, New Jersey, 1998, Formatting and Baseband Transmission, Chap. 2, Section 2.11.2, pp. 104-106.
Taiwan Search Report—TW095129021—TIPO—May 24, 2011.
Dammann, A. et al., "Beamforming in Combination with Space-Time Diversity for Broadband OFDM Systems", ICC 2002. 2002 IEEE International Conference on Communications. Apr. 28-May 2, 2002, pp. 165-171, XP010589479.
Ken Murakami et al., "Status Toward Standardization at IEEE 802. 3ah and Challenge to System Architecture," Technical Report of the Institute of Electronics, Information and Communication Engineers, Jun. 13, 2003, vol. 103, No. 124, pp. 1-6, IN2003-24.
Sklar, B., "The process of thus correcting the channel-induced distortion is called equalization", Digital Communications, PTR Prentice Hall, Upper Saddle River, New Jersey, 1998, Formatting and Baseband Transmission, Chap. 2, Section 2.11.2, pp. 54,104-106.

(56) References Cited

OTHER PUBLICATIONS

Viswanath P. et al: "Opportunistic beamforming using dumb antennas" IEEE Transactions on Information Theory IEEE USA, vol. 48, No. 6, Jun. 2002, pp. 1277-1294, XP002314708 ISSN: 0018-9448 abstract right-hand column, paragraph 1.
Alcatel-Lucent, et al., "Dedicated Reference Signals for Precoding in E-UTRA Downlink" 3GPP Draft; R1-071718, 3rd Generation Partnership Project (3GPP), Mobile Competence Centre ; 650, Route Des Lucioles ; F-06921 Sophia-Antipolis Cedex ; France, vol. RAN WG1, no. St. Julian; Apr. 3, 2007, XP050105640 [retrieved on Apr. 3, 2007].
Bengtsson, M. et al, "A Generalization of Weighted Subspace Fitting to Full-Rank Models", IEEE Transactions on Signal Processing, IEEE Service Center, New York, NY, US, vol. 49, No. 5, pp. 1002-1012, May 1, 2001.
European Search Report—EP10184156—Search Authority—Munich—Jun. 14, 2012.
Miorandi D., et al., "Analysis of master-slave protocols for real-time industrial communications over IEEE 802.11 WLANs" Industrial Informatics, 2004. INDIN '04, 2nd IEEE International Conference on Berlin, Germany Jun. 24-26, 2004. Piscataway, NJ, USA IEEE, Jun. 24, 2004, pp. 143-148, XP010782619, ISBN 0789385136, Para 3, point B.
Physical Channels and Multiplexing in Evolved UTRA Downlink TSG-RAN Working Group 1 Meeting, XX, XX, vol. RI-050590, Jun. 20, 2005, pp. 1-24, XP003006923 the whole document.
Siemens, "Evolved UTRA uplink scheduling and frequency reuse" [online], 3GPP TSG-RAN WG1 # 41 R1-050476, Internet <URL:http://www.3gpp.org/ftp/tsg_ran/WG1_RL1/TSGR1_41/Docs/R1-050476.zip>, May 9, 2005.
Yatawatta, S. et al., "Energy Efficient Channel Estimation in MIMO Systems", 2005.
IEEE International Conference on Acoustics, Speech, and Signal Processing, Mar. 18-23, 2005, Philadelphia, vol. 4, pp. 317-320, Mar. 18, 2005.
LG Electronics: "PAPR comparison of uplink MA schemes", 3GPP TSG RAN WG1 Meeting #41, R1-050475, May 9-13, 2005, pp. 6.
Motorola, "Uplink Numerology and Frame Structure", 3GPP TAG RAN1 #41 Meeting R1-050397, May 13, 2005.
Samsung Electonics Co. Ltd.; "Uplink Multiple Access and Multiplexing for Evolved UTRA", R1-050439, May 3, 2005, pp. 1-22, XP55018616, Retrieved from the Internet: URL:http://www.3gpp.org/ftp/tsg_ran/WG1_R1/TSGR1 / DOCS / [retrieved on Feb. 7, 2012].
3rd Generation Partnership Project; Technical Specification Group Radio Access Network; Physical Layer Aspects for Evolved UTRA (Release 7), 3GPP TR 25.814 v0.3.1 (Nov. 2005).
B. Sklar: "The process of thus correcting the channel-induced distortion is called equalization", Digital Communications, PTR Prentice Hall, Upper Saddle River, New Jersey, 1998, Formatting and Baseband Transmission, Chap. 2, Section 2.11.2, pp. 104-105.
Bahai, Saltzberg: "System Architecture," Multi-Carrier Digital Communications, Kluwer Academic, New York, NY, XP-002199501, 1999, pp. 17-21.
Bingham: "Other Types of MCM," ADSL, VDSL, and Multicarrier Modulation, John wiley & Sons, New York, XP-002199502. 2000, pp. 111-113.
Carl R. Nassar, Balasubramaniam Natarajan and Steve Shattil: Introduction of Carrier Interference to Spread Spectrum Multiple Access, Apr. 1999, IEEE, pp. 1-5.
Chennakeshu, et al. "A Comparison of Diversity Schemes for a Mixed-Mode Slow Frequency-Hopped Cellular System," IEEE, 1993, pp. 1749-1753.
Chennakeshu, et al. "Capacity Analysis of a TDMA-Based Slow-Frequency—Hopped Cellular System," IEEE Transaction on Vehicular Technology, vol. 45., No. 3 Aug. 1996, pp. 531-542.
Chiani, et al. "Outage Evaluation for Slow Frequency-Hopping Mobile Radio Systems" IEEE Transactions on Communications, vol. 47, No. 12, pp. 1865-1874, Dec. 1999.
Choi, et al., "Design of the Optimum Pilot Pattern for Channel Estimation in OFDM Systems," Global Telecommunications Conference, IEEE Communications Society, Globecom, Dallas, Texas (2004), p. 3661-3665.
Czylwik: "Comparison Between Adaptive OFDM and Single Carrier Modulation with Frequency Domain Equalization," IEEE 47th Vehicular Technology Conference, vol. 2, May 4-7, 1997, pp. 865-869.
Das, Arnab, et al. "Adaptive, asynchronous incremental redundancy (A-IR) with fixed transmission time intervals TTI for HSDPA." IEEE, pp. 10-83-1087, year 2002.
Das, et al. "On the Reverse Link Interference Structure for Next Generation Cellular Systems," European Microwave Conference, Oct. 11, 2004, pp. 3068-3072.
Digital cellular telecommunications system (Phase 2+); Mobile radio interface layer 3 specification (GSM 04.08 version 7.7.1 Release 1998); ETSI EN 300 940 V7.7.1 (Oct. 2000), pp. 1,2,91-93.
Dinis, et al., "A Multiple Access Scheme for the Uplink of Broadband Wireless Systems," IEEE Global Telecommunications Conference, 2004, Globecom '04, vol. 6, Nov. 29 Dec. 3, 2004, pp. 3808-3812.
Favre et al: "Self-Adaptive Transmission Procedure" IBM Technical Disclosure Bulletin, IBM Corporation, Sep. 1976, vol. 19, No. 4, pp. 1283-1284, New York, New York.
Fuchs, et al., "A Novel Tree-Based Scheduling Algorithm for the Downlink of Multi-User MIMO Systems with ZF Beamforming," IEEE International Conference on Acoustics, Speech, and Signal Processing, 2005, Proceedings, Philadelphia, PA, pp. 1121-1124.
Groe, et al., "CDMA Mobile Radio Design," Sep. 26, 2001, Artech House, Norwood, MA 02062, pp. 257-259.
Hermann Rohling et al., : "Performance Comparison of Different Multiple Access Schemes for the Downlink of an OFDM Communication System", Vehicular Technology Conference, 1997, 47th IEEE, vol. 3, May 4-7, 1997, pp. 1365-1369.
Hill, et al., "Cyclic Shifting and Time Inversion of Partial Transmit Sequences to Reduce the Peak-to-Average Power Ratio in OFDM," IEEE International Symposium on Personal, Indoor and Mobile Radio Communications, vol. 2, Sep. 18, 2000, Piscataway, NJ, pp. 1256-1259.
J.S. Chow and J.M. Cioffi: "A cost-effective maximum likelihood reciever for multicarrier systems", Proc. IEEE Int. Conf. on Comm., pp. 948-952, Jun. 1992.
Je, et al. "A Novel Multiple Access Scheme for Uplink Cellular Systems," IEEE Vehicular Technology Conference, Sep. 26, 2004 pp. 984-988.
John B. Groe, Lawrence E. Larson, "CDMA Mobile Radio Design" Sep. 26, 2001, Artech House, Norwood, MA02062 580530, XP002397967, pp. 157-159.
Kaleh: "Channel Equalization for Block Transmission Systems," IEEE Journal on Selected Areas in Communications, vol. 13, No. 1, Jan. 1995, pp. 110-121.
Kappes, J.M., and Sayegh, S.1., "Programmable Demultiplexer/Demodulator Processor," COMSAT Laboratories, IEEE, 1990, pp. 230-234.
Karsten Bruninghaus et al., : "Multi-Carrier Spread Spectrum and It's relationship to Single-Carrier Transmission", Vehicular technology Conference, 1998, VTC 98, 48th IEEE, vol. 3, May 18-21, 1998, pp. 2329-2332.
Keller, et al.: "Adaptive Multicarrier Modulation: A Convenient Framework for Time-Frequency Processing in Wireless Communications," Proceedings of the IEEE, vol. 88, No. 5, May 2000, pp. 611-640.
Kim, et al. "Performance of TDMA System With SFH and 2-Bit Differentially Detected GMSK Over Rayleigh Fading Channel," IEEE Vehicular Technology Conference, Apr. 28, 1996, pp. 789-793.
Kishiyama Y et al: "Investigation of Optimum Pilot Channel Structure for VSF-OFCDM Broadband Wireless Access in Forward Link", IEEE Vehicular Technology Conference, New York, NY, US, vol. 4, Apr. 22, 2003, p. 139-144.
Kostic, et al. "Dynamic Frequency Hopping in Wireless Cellular Systems-Simulations of Full-Replacement and Reduced-Overhead Methods," IEEE Vehicular Technology Conference, May 16, 1999, pp. 914-918.

(56) References Cited

OTHER PUBLICATIONS

Kostic, et al. "Fundamentals of Dynamic Frequency Hopping in Cellular Systems," IEEE Journal on Selected Areas in Communications, vol. 19, No. 11, Nov. 2001, pp. 2254-2266.
Lacroix, et al.: "A Study of OFDM Parameters for High Data Rate Radio LAN's," 2000 IEEE 51st Vehicular Technology Conference Proceedings, vol. 2, May 15-18, 2000, pp. 1075-1079.
Laroia, R. et al: "An integrated approach based on cross-layer optimization—Designing a mobile broadband wireless access network" IEEE Signal Processing Magazine, IEEE Service Center, Piscataway, NJ, US, vol. 21, No. 5, Sep. 2004, pp. 20-28, XP011118149.
Leon, et al., "Cyclic Delay Diversity for Single Carrier-Cyclic Prefix Systems," Conference Record of the Thirty-Ninth Asilomar Conference on Signals, Systems and Computers, Oct. 28, 2005, Piscataway, NJ, pp. 519-523.
Lettieri et al: "Adaptive frame length control for improving wireless link throughput, range, and energy efficiency", INFOCOM 98, 17th Annual Joint Conference of the IEEE Computer and Communications Societies, Mar. 29-Apr. 2, 1998, pp. 564-571, vol. 2, IEEE San Francisco, CA, New York, New York.
Lott: "Comparison of Frequency and Time Domain Differential Modulation in an OFDM System for Wireless ATM," 1999 IEEE 49th Vehicular Technology Conference, vol. 2, Jul. 1999, pp. 877-883.
Mignone, et al.: "CD3-OFDM: A New Channel Estimation Method to Improve the Spectrum Efficiency in Digital Terrestrial Television Systems," International Broadcasting Convention, Sep. 14-18, 1995 Conference Publication No. 413, IEE 1995, pp. 122-128.
Molisch, et al., MIMO systems with antenna selection, IEEE Microwave Magazine, URL: http://ieeexplore.ieee.org/iel5/6668/28677/01284943.pdf, Retrieved on Dec. 8, 2006, pp. 46-56 (2004).
Naofal Al-Dhahir: "A Bandwidth-Optimized Reduced-Complexity Equalized Multicarrier Transceiver", IEEE Transactions on Communications, vol. 45, No. 8, Aug. 1997.
Naofal Al-Dhahir: "Optimum Finite-Length Equalization for Multicarrier Transceivers", IEEE Trans. on Comm., pp. 56-64, Jan. 1996.
Nassar, Carl R., et al., "High-Performance MC-CDMA via Carrier Interferometry Codes", IEEE Transactions on Vehicular Technology, vol. 50, No. 6, Nov. 2001.
NTT DoCoMo, et al.: "Orthogonal Common Pilot Channel and Scrambling Code in Evolved UTRA Downlink," 3GPP TSG RAN WG1 #42 on LTE, pp. 1-8 (Aug.-Sep. 2005).
Sari, et al., "Transmission Techniques for Digital Terrestrial TV Broadcasting," IEEE Communications Magazine, Feb. 1995, pp. 100-109.
Schnell, et al, "Application of IFDMA to Mobile Radio Transmission," IEEE 1998 International Conference on Universal Personal Communications, vol. 2, Oct. 5-9, 1998, pp. 1267-1272.
Schnell, et al., "A Promising New Wideband Multiple-Access Scheme for Future Mobile Communications Systems," European Transactions on Telecommunications, Wiley & Sons, Chichester, GB, vol. 10, No. 4, Jul. 1999, pp. 417-427.
Shattil et al., "Array Control Systems for Multicarrier Protocols Using a Frequency-Shifted Feedback Cavity", IEEE, 1999.
Sorger U. et al., : "Interleave FDMA—a new spread-spectrum multiple-access scheme", IEEE Int. Conference on Atlanta, GA, USA Jun. 7-11, 1998, XP010284733.
Tellado, "Multicarrier Modulation with Low Par," Kluwer Academic, Dordrecht, NL, XP-002199500, 2000, pp. 6-11 and 55-60.
Tellambura, "Use of m-sequences for OFDM Peak-to-Average Power Ratio Reduction," Electronics Letters, vol. 33, No. 15, Jul. 17, 1997, pp. 1300-1301.
TIA/EIA/IS-2000 "Standards for CDMA2000 Spread Spectrum Systems" Version 1.0 Jul. 1999.
TIA/EIA/IS-95 "Mobile Station-Base Station Compatibility Standard for Dual-Mode Wideband Spread Spectrum Cellular System" Jul. 1993.
TIA-1121.001 "Physical Layer for Ultra Mobile Broadband (UMB) Air Interface Specification," 3GPP2 C.S0084-001-0, Version 2.0 (Aug. 2007).
TIA-1121.002 "Medium Access Control Layer for Ultra Mobile Broadband (UMB) Air Interface Specification," 3GPP2 C.S0084-002-0, Version 2.0 (Aug. 2007).
Tomcik, J.: "MBFDD and MBTDD Wideband Mode: Technology Overview," IEEE 802.20 Working Group Mobile Broadband Wireless Access, Jan. 2006, pp. 1-109, XP002429968.
Tomcik, J.: "QFDD Technology Overview Presentation," IEEE 802.20 Working Group on Mobile Broadband Wireless Access, Slides/pp. 1-73, Nov. 15, 2005 and Oct. 28, 2005.
Torrieri, "Cellular Frequency-Hopping CDMA Systems," IEEE Vehicular Technology Conference, May 16, 1999, pp. 919-925.
Toufik I et al., "Channel allocation algorithms for multi-carrier systems", Vehicular Technology Conference, 2004. VTC2004-Fall. 2004 IEEE 60th Los Angeles, CA, USA Sep. 26-29, 2004, pp. 1129-1133, XP010786798, ISBN: 07-7803-8521-7.
Xiaodong, et al., "M-Sequences for OFDM Peak-to-Average Power Ratio Reduction and Error Correction," Electronics Letters, vol. 33, Issue 7, Mar. 27, 1997, pp. 554-555.
Zekri, et al., "DMT Signals with Low Peak-to-Average Power Ratio," Proceedings, IEEE International Symposium on Computers and Communications, 1999, Jul. 6-8, 1999, pp. 362-368.
Anonymous: "3GPP TS 36.211 V8.0.0; Evolved Universal Terrestrial Radio Access (E-UTRA); Physical channels and modulation (Release 8)" 3rd Generation Partnership Project; Technical Specification Group Radio Access Network, [Online] 2007, XP002520076 Retrieved from the Internet: URL:http://www.Sgpp.org/ftp/Specs/html-i nfo/36211.htm> [retrieved on Sep. 27, 2007] Section 5.
Bhushan N., "UHDR Overview", C30-20060522-037, Denver, Co, May 22, 2006, pp. 1-115.
Jim Tomcik, QFDD and QTDD: Technology Overview, IEEE 802.20 Working Group on Mobile Broadband Wireless Access, Oct. 28, 2005, pp. 48-50, URL, http://www.ieee802.org/20/contribs/C802.20-05-68.zip.
Nokia: "Compact signalling of multi-code allocation for HSDPA", version 2,3GPP R1-02-0018, Jan. 11, 2002.
Samsung: "Uplink Transmission and Multiplexing for EUTRA", 3GPP Draft; R1-050605 UL Multiplexing, Jun. 16, 2005, XP050111420.
Sethi M, et al., "Code Reuse DS-CDMA—A Space Time Approach", Proceedings of the 2002 IEEE International Conference on Acoustics, Speech, and Signal Processing (ICASSP), pp. 2297-2300, May 13-17, 2002.
Tachikawa (Editor); "W-CDMA Mobile Communication Systems," John Wiley & Sons Ltd., Japan, Maruzen: pp. 82-213, Jun. 25, 2001.
Sklar, B., "The process of thus correcting the channel-induced distortion is called equalization", Digital Communications, PTR Prentice Hall, Upper Saddle River, New Jersey, 1998, Formatting and Baseband Transmission, Chap. 2, Section 2.11.2, pp. 54, 104-106.
Tomcik J., "QFDD and QTDD: Proposed Draft Air Interface Specification," IEEE C802.20-05/69, IEEE 802.20 Working Group on Mobile Broadband Wireless Access, Oct. 28, 2005, p. 1-6, 1-7, 1-16, 6-65, 7-11 ,7-33, 7-37~7-55, 9-21, 9-22, 9-24~9-32.
Digital cellular telecommunications system (Phase 2+); General Packet Radio Service (GPRS); Mobile Station (MS)-Base Station System (BSS)interface; Radio Link Control/Medium Access Control (RLC/MAC) protocol (GSM 04.60 version 8.4.1 Release 1999), 3GPP Standard; Etsi En 301 349, 3RD Generation Partnership Project (3GPP), Mobile Competence Centre; 650, Route Des Lucioles; F-06921 Sophia-Antipolis Cedex; France, No. V8.4.1, Oct. 1, 2000, pp. 1-243, XP050358534.
Institute for Infocomm Research et al., "Intra-Node B Macro Diversity based on Cyclic Delay Transmissions", 3GPP TSG RAN WG1 #42 on LTE, R1-050795, Aug. 29-Sep. 2, 2005, pp. 1-5.
Sommer D., et al., "Coherent OFDM transmission at 60 GHz", Vehicular Technology Conference, 1999, VTC 199—Fall, IEEE VTS 50TH Amsterdam, Netherlands Sep. 19-22, 1999, Piscataway, NJ, USA, IEEE, US, vol. 3, Sep. 19, 1999, pp. 1545-1549, XP010353233, DOI: 10.1109/VETECF.1999.801553, ISBN: 978-0/7803-5435-7.
Zhang H., "A new space-time-frequency MIMO-OFDM scheme with cyclic delay diversity", Frontiers of Mobile and Wireless Communication, 2004. Proceedings of the IEEE 6th Circuits and Systems Symposium on vol. 2, Jun. 2, 2004, pp. 647 to 650.

\* cited by examiner

SYSTEMS AND METHODS FOR BEAMFORMING FEEDBACK IN MULTI ANTENNA COMMUNICATION SYSTEMS

REFERENCE TO CO-PENDING APPLICATIONS FOR PATENT

The present application claims priority from Provisional Application Ser. No. 60/665,120, filed Mar. 24, 2005, entitled "PSEUDO-EIGENBEAMFORMING IN FDD SYSTEMS", Provisional Application Ser. No. 60/691,808, filed Jun. 16, 2005, entitled "SYSTEMS AND METHODS FOR EIGENBEAMFORMING IN MULTI ANTENNA COMMUNICATIONS SYSTEMS", and Provisional Application Ser. No. 60/710,402, filed Aug. 22, 2005, entitled "SYSTEMS AND METHODS FOR BEAM FORMING FEEDBACK IN MULTI ANTENNA COMMUNICATION SYSTEMS," which are assigned to the assignee hereof, and expressly incorporated by reference herein in their entirety.

The present Application is related to the following co-pending U.S. Patent Application: "Systems And Methods For Generating Beamforming Gains In Multi-Input Multi-Output Communication Systems," application Ser. No. 11/186,152 filed on Jul. 20, 2005; U.S. patent application Ser. No. 11/186,697, titled "Systems And Methods For Generating Beamforming Gains In Multi-Input Multi-Output Communication Systems," filed on Jul. 20, 2005, Application Ser. No. 60/660,925 filed Mar. 10, 2005; and U.S. Patent Application: "Systems And Methods For Generating Beamforming Gains In Multi-Input Multi-Output Communication Systems," filed on even date herewith, Application Ser. No. 60/667,705 filed Apr. 1, 2005, each of which are assigned to the assignee hereof, and expressly incorporated by reference herein.

BACKGROUND

I. Field

The present document relates generally to wireless communication and amongst other things to eigen-beam forming for wireless communication systems.

II. Background

An orthogonal frequency division multiple access (OFDMA) system utilizes orthogonal frequency division multiplexing (OFDM). OFDM is a multi-carrier modulation technique that partitions the overall system bandwidth into multiple (N) orthogonal frequency subcarriers. These subcarriers may also be called tones, bins, and frequency channels. Each subcarrier is associated with a respective sub carrier that may be modulated with data. Up to N modulation symbols may be sent on the N total subcarriers in each OFDM symbol period. These modulation symbols are converted to the time-domain with an N-point inverse fast Fourier transform (IFFT) to generate a transformed symbol that contains N time-domain chips or samples.

In a frequency hopping communication system, data is transmitted on different frequency subcarriers during different time intervals, which may be referred to as "hop periods." These frequency subcarriers may be provided by orthogonal frequency division multiplexing, other multi-carrier modulation techniques, or some other constructs. With frequency hopping, the data transmission hops from subcarrier to subcarrier in a pseudo-random manner. This hopping provides frequency diversity and allows the data transmission to better withstand deleterious path effects such as narrow-band interference, jamming, fading, and so on.

A problem in most communication systems is that the receiver is located in a specific portion of an area served by the access point. In such cases, where a transmitter has multiple transmit antennas, the signals provided from each antenna need not be combined to provide maximum power at the receiver. In these cases, there may be problems with decoding of the signals received at the receiver. One way to deal with these problems is by utilizing beamforming.

Beamforming is a spatial processing technique that improves the signal-to-noise ratio of a wireless link with multiple antennas. Typically, beamforming may be used at either the transmitter or the receiver in a multiple antenna system. Beamforming provides many advantages in improving signal-to-noise ratios which improves decoding of the signals by the receiver.

Certain types of OFDMA systems are frequency division duplexed (FDD) OFDMA systems. In these FDD OFDMA systems, the transmission from the access point to the access terminal and from the access terminal to the access point occupy different distinct frequency bands. In FDD OFDMA systems feedback to perform beamforming generally requires knowledge of the channel at the transmitter, e.g. access point, which is not available without substantial feedback. This feedback, generally in the form of the actual beamforming weights or vectors, requires a large amount of resources on control or signaling channels. This reduces data rates and increases the overhead required.

Therefore, it is desired that systems provide feedback for more accurate beamforming while minimizing the resources needed to provide the feedback from the receiver to the transmitter.

SUMMARY

In some embodiments, available reverse link transmission resources allocated for transmission of beamforming information are determined based upon the determination of the available reverse link transmission resources. In some embodiments, this may be performed by a processor or other means. Further, in some embodiments this information is transmitted over the air as an instruction.

In certain embodiments, a determination whether to transmit eigenbeam information from the at least one antenna is based upon channel information. In some embodiments, the channel information may be channel statistics or second order channel statistics. In other embodiments, the channel information may be instantaneous channel information.

It is understood that other aspects of the present disclosure will become readily apparent to those skilled in the art from the following detailed description, wherein is shown and described only exemplary embodiments of the disclosure, simply by way of illustration. As will be realized, the embodiments disclosed are capable of other and different embodiments and aspects, and its several details are capable of modifications in various respects, all without departing from the scope of the disclosure.

BRIEF DESCRIPTION OF THE DRAWINGS

The features, nature, and advantages of the present embodiments may become more apparent from the detailed description set forth below when taken in conjunction with the drawings in which like reference characters identify correspondingly throughout and wherein.

DETAILED DESCRIPTION

Figure 1:
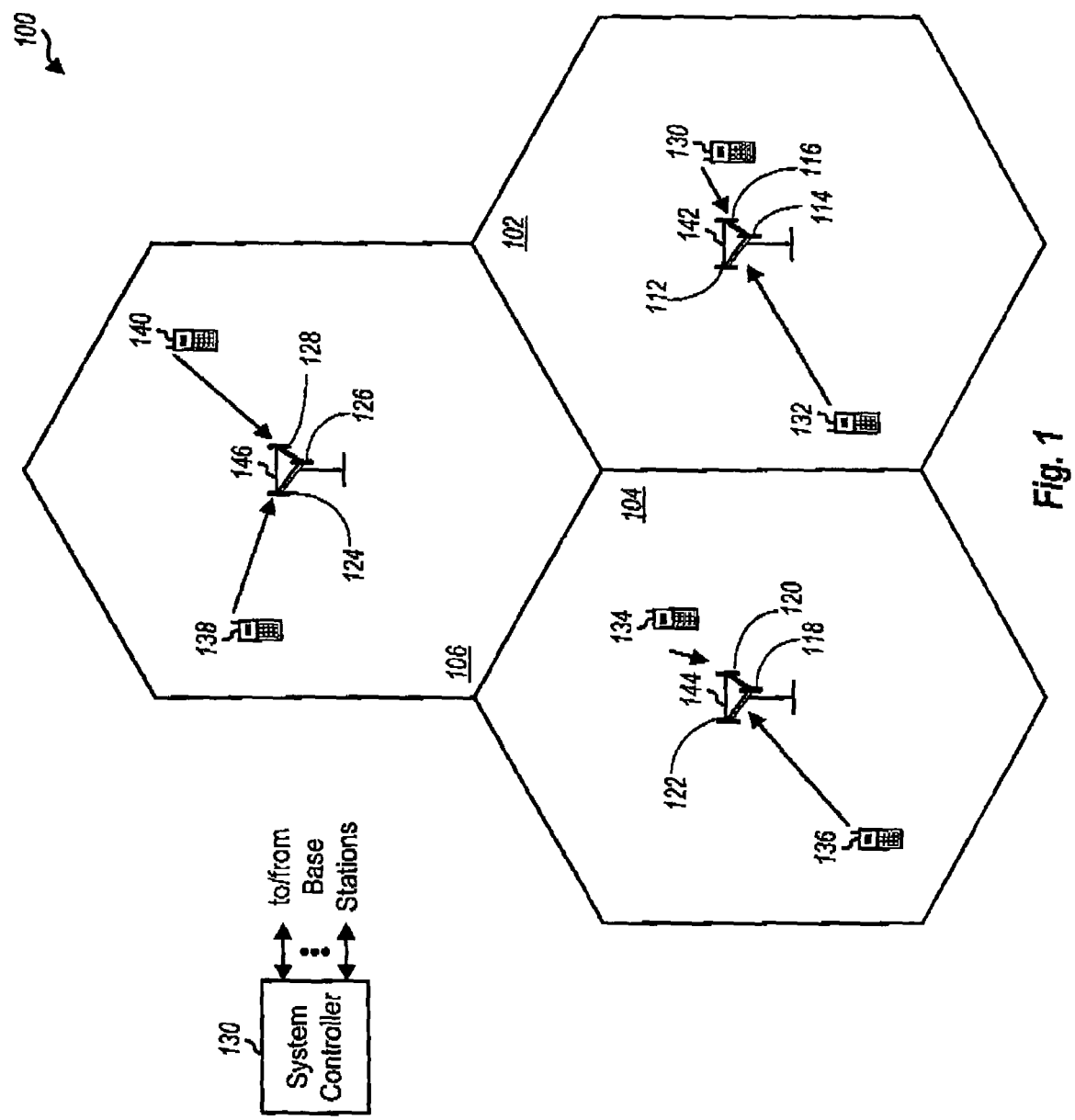
FIG. 1 illustrates a multiple access wireless communication system according to an embodiment.

Referring to FIG. 1, a multiple access wireless communication system according to one embodiment is illustrated. A multiple access wireless communication system 100 includes multiple cells, e.g. cells 102, 104, and 106. In the embodiment of FIG. 1, each cell 102, 104, and 106 may include an access point 150 that includes multiple sectors. The multiple sectors may be formed by groups of antennas each responsible for communication with access terminals in a portion of the cell. In cell 102, antenna groups 112, 114, and 116 each correspond to a different sector. In cell 104, antenna groups 118, 120, and 122 each correspond to a different sector. In cell 106, antenna groups 124, 126, and 128 each correspond to a different sector.

Each cell includes several access terminals which may be in communication with one or more sectors of each access point. For example, access terminals 130 and 132 are in communication base station 142, access terminals 134 and 136 are in communication with access point 144, and access terminals 138 and 140 are in communication with access point 146.

It can be seen from FIG. 1 that each access terminal 130, 132, 134, 136, 138, and 140 is located in a different portion of its respective cell than each other access terminal in the same cell. Further, each access terminal may be a different distance from the corresponding antenna groups with which it is communicating. Both of these factors provide situations, also due to environmental and other conditions in the cell, to cause different channel conditions to be present between each access terminal and its corresponding antenna group with which it is communicating.

As used herein, an access point may be a fixed station used for communicating with the terminals and may also be referred to as, and include some or all the functionality of, a base station, a Node B, or some other terminology. An access terminal may also be referred to as, and include some or all the functionality of, a user equipment (UE), a wireless communication device, terminal, a mobile station or some other terminology.

Figure 2:
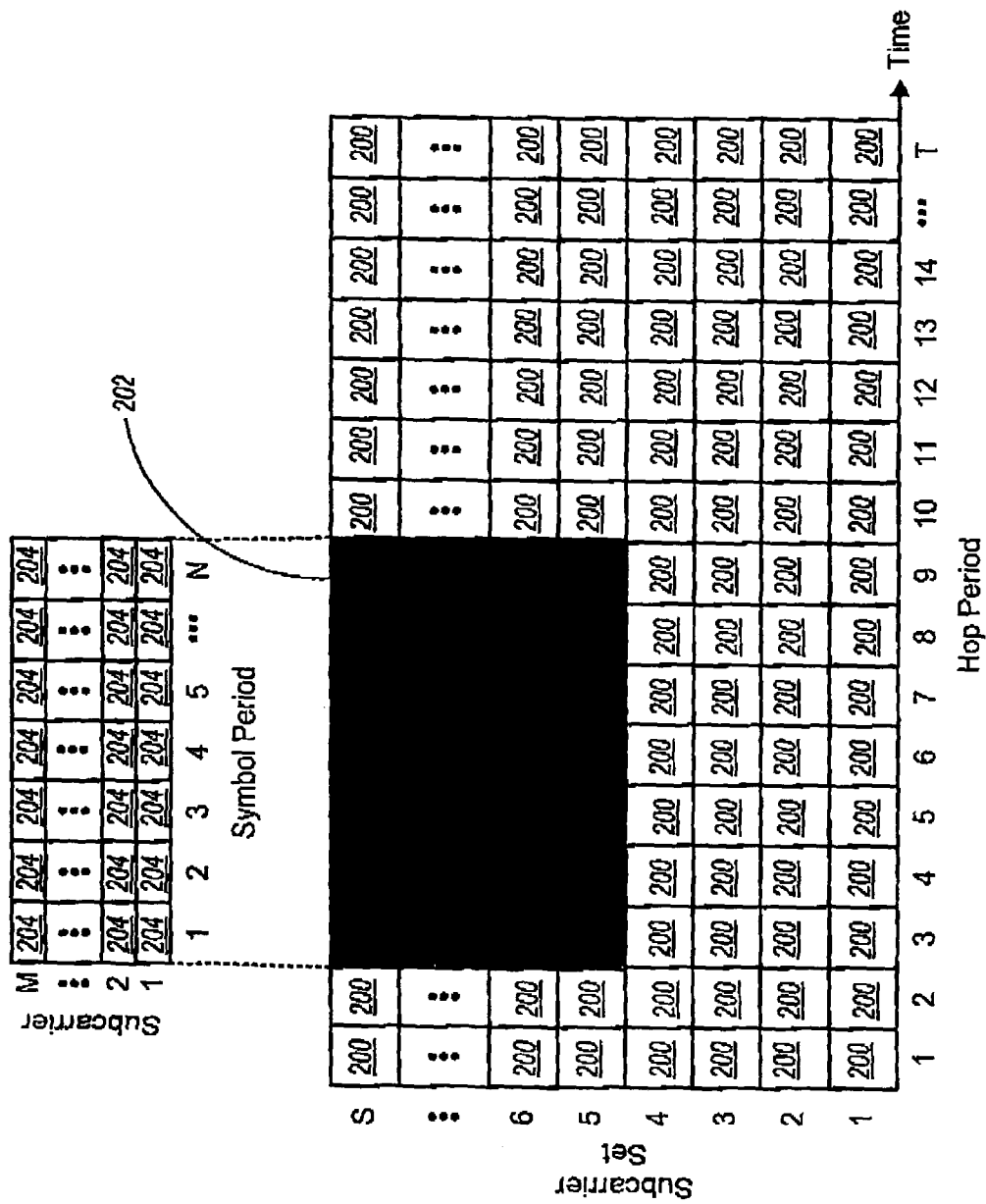
FIG. 2 illustrates a spectrum allocation scheme for a multiple access wireless communication system according to an embodiment.

Referring to FIG. 2, a spectrum allocation scheme for a multiple access wireless communication system is illustrated. A plurality of OFDM symbols 200 is allocated over T symbol periods and S frequency subcarriers. Each OFDM symbol 200 comprises one symbol period of the T symbol periods and a tone or frequency subcarrier of the S subcarriers.

In an OFDM frequency hopping system, one or more symbols 200 may be assigned to a given access terminal. In one embodiment of an allocation scheme as shown in FIG. 2, one or more hop regions, e.g. hop region 202, of symbols to a group of access terminals for communication over a reverse link. Within each hop region, assignment of symbols may be randomized to reduce potential interference and provide frequency diversity against deleterious path effects.

Each hop region 202 includes symbols 204 that may be assigned to the one or more access terminals that are in communication with the sector of the access point and assigned to the hop region. During each hop period, or frame, the location of hop region 202 within the T symbol periods and S subcarriers varies according to a hopping sequence. In addition, the assignment of symbols 204 for the individual access terminals within hop region 202 may vary for each hop period.

The hop sequence may pseudo-randomly, randomly, or according to a predetermined sequence, select the location of the hop region 202 for each hop period. The hop sequences for different sectors of the same access point may be designed to be orthogonal to one another to avoid "intra-cell" interference among the access terminal communicating with the same access point. Further, hop sequences for each access point may be pseudo-random with respect to the hop sequences for nearby access points. This may help randomize "inter-cell" interference among the access terminals in communication with different access points.

In the case of a reverse link communication in an FDD communication system, the frequency subbands 1 to S do not overlap with any of the subbands of 1 to S of the forward link. In the reverse link, some of the symbols 204 of a hop region 202 may be assigned to pilot symbols that may be transmitted from the access terminals to the access point. The assignment of pilot symbols to the symbols 204 should, in an embodiment, support space division multiple access (SDMA), where signals of different access terminals overlapping on the same hop region can be separated due to multiple receive antennas at a sector or access point, provided enough difference of spatial signatures corresponding to different access terminals.

It should be noted that while FIG. 2 depicts hop region 200 having a length of seven symbol periods, the length of hop region 200 can be any desired amount, may vary in size between hop periods, or between different hopping regions in a given hop period.

Also, it should be noted that while the embodiment of FIG. 2 is described with respect to utilizing block hopping, the location of the block need not be altered between consecutive hop periods.

Figure 3:
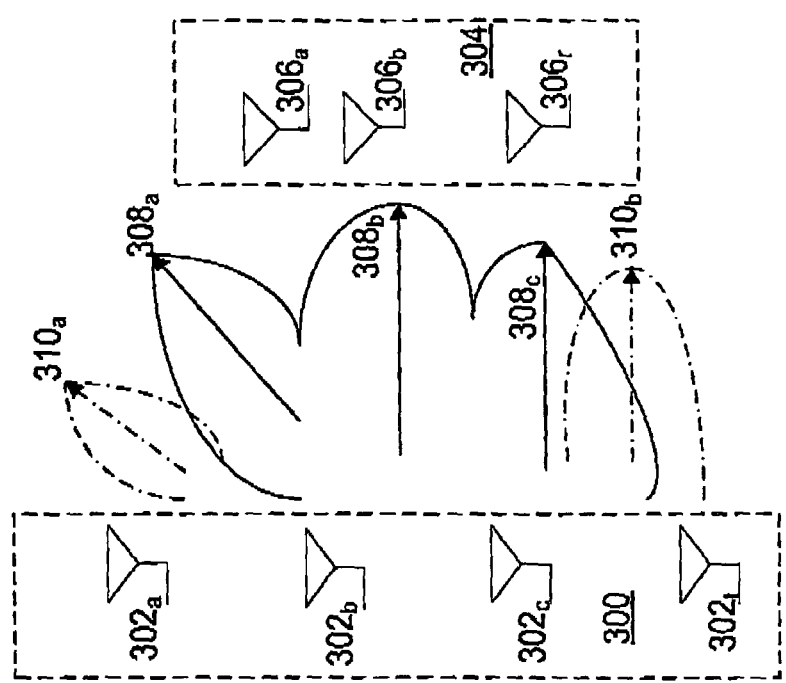
FIG. 3 illustrates a conceptual block diagram of eigenbeams experienced by a receiver in a wireless communication system according to an embodiment.

Referring to FIG. 3, a conceptual block diagram of eigenbeams experienced at a wireless communication system according to one embodiment is illustrated. A transmitter 300, which may be an access point, transmits multiple symbols during a given hop period intended for receiver 304, which may be an access terminal. Signals transmitted from transmitter 300 are transmitted from antennas $302_a$, $302_b$, $302_c$, ..., $302_t$ and received by receiver 304 at antennas $306_a$, $306_b$, $306_c$, ..., $306_r$. This forms a MIMO channel between transmitter 300 and receiver 304. In transmitting symbols from transmitter 300 to receiver 304, transmitter 300 eigenbeamforms the symbols. Eigenbeamforming is a technique that combines beamforming, diversity and spatial multiplexing gains, using eigenvectors to multiply, phase shift, and/or amplitude shifts of symbols for transmission depending on the antenna from which they are to be transmitted.

In one embodiment, a transmitter 300 transmits pilot symbols from antennas $302_a, 302_b, 302_c, \ldots, 302_t$ which are used by the receiver 304 to estimate the downlink channel and calculate its correlation matrix. Then, the receiver 304 performs eigenvalue decomposition of the correlation matrix and provides information regarding the eigenvectors to the transmitter 300. In some embodiments, the receiver 304 determines which of the eigenvector beam patterns would yield the highest signal-to-noise ratio (SNR) or other desired signal characteristics and transmits this information to the base station which may use this eigenvector information for beam shaping for data signal transmission to this mobile station on later transmissions.

As depicted in FIG. 3, the eigenbeams may have several (local) maxima $308_a$, $308_b$, and $308_c$ pointing in different directions. Other eigenbeams may have portions $310_a$, and $310_b$ that point in other directions but have a lower magnitude, as received at receiver 304, than eigenbeams having maxima $308_a$, $308_b$, and $308_c$. Further, the radiation pattern and therefore those eigenbeams having the greatest maxima of can vary over time as the channel conditions, the location of the receiver, or other factors change.

In order to provide sufficient information for performing eigenbeamforming at transmitter 300, receiver 304 provides feedback information regarding the eigenvectors to transmitter 300. In an embodiment, feedback is provided based upon the channel conditions. For example, in an embodiment, if channel conditions are substantially unchanging feedback may be provided. In other embodiments, if channel conditions have recently changed then feedback may be provided. In additional, embodiments, if channel conditions are constantly changing, no feedback or minimum feedback may be provided. In further embodiments, feedback may be provided if there is a recent change in the channel conditions or channel conditions are substantially unchanging. In some embodiments, changes in channel conditions may be determined by changes in channel statistics, instantaneous channel information or signal-to-noise ratios.

In one embodiment, the feedback may comprise eigenvectors calculated at the receiver 304 for the dominant eigenbeams experienced by the receiver 304. In some embodiments, the information regarding the eigenvectors for the dominant eigenbeams is quantized according to a codebook and then the quantized bits are transmitted to the transmitter 302 that includes a codebook for reading the quantized bits.

In an embodiment, the quantized bits are based on the minimum mean square error between the codebook and the dominant eigenbeams, or the dominant beams and the other eigenbeams.

The feedback provided by the access terminal is utilized to form a preliminary beamforming matrix comprising a plurality of eigenvectors that have been feedback from the receiver to the transmitter. Due to limited reverse link resources, this preliminary beamforming matrix may not comprise of all the eigenvectors necessary for transmission.

In order to form the set of eigenbeamforming vectors that provide the best available transmission characteristics, a QR decomposition of the beamforming matrix is performed to form the complete set of eigenvectors, as follows:

$$V = QR \ (B)$$

$B = [v_1 \ v_2 \ \ldots \ v_k]$ are the K-eigen vectors that have been fedback

B is the "preliminary" beamforming matrix. V is the "final" beamforming matrix consisting of the complete set of eigenvectors.

$$V = [v_1 \ v_2 \ \ldots \ v_k \ v_{k+1} \ \ldots \ v_M]$$

$v_{k+1} \ldots v_M$ are the pseudo-eigenvectors that have been generated from the QR decomposition The individual scalars of the beamform vectors represent the beamforming weights that are applied to the symbols transmitted from the $M_T$ antennas to each access terminal. These vectors then are formed by the following:

$$F_M = \frac{1}{M} [ v_1 \quad v_2 \quad \cdots \quad v_M ] \qquad \text{Eq. 6}$$

where M is the number of layers utilized for transmission. In order to decide how many eigenbeams should be used (rank prediction), and what transmission mode should be used to obtain maximum eigenbeamforming gains, several approaches may be utilized. If the access terminal is not scheduled, the eigenbeam feedback, e.g. a 7-bit or other sized feedback may include rank information, may be computed based on from the broadband pilots and reported along with the eigenbeam information. The control or signaling channel information transmitted from the access terminal, after being decoded, may act as a broadband pilot for the reverse link.

Figure 4:
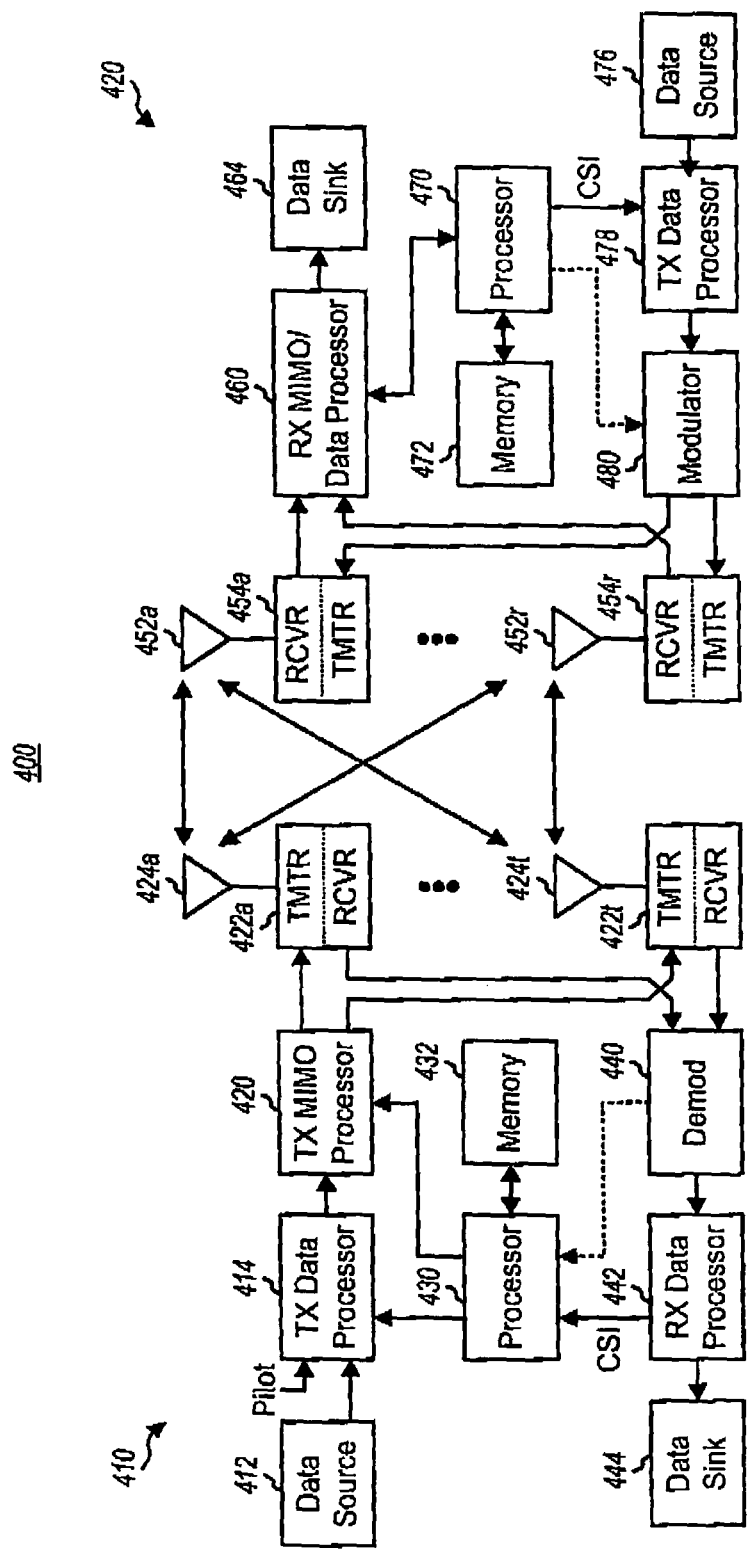
FIG. 4 illustrates a transmitter and receiver in a multiple access wireless communication system an embodiment.

Referring to FIG. 4, a transmitter and receiver in a multiple access wireless communication system one embodiment is illustrated. At transmitter system 410, traffic data for a number of data streams is provided from a data source 412 to a transmit (TX) data processor 414. In an embodiment, each data stream is transmitted over a respective transmit antenna. TX data processor 414 formats, codes, and interleaves the traffic data for each data stream based on a particular coding scheme selected for that data stream to provide coded data. In some embodiments, TX data processor 414 applies beamforming weights to the symbols of the data streams based upon the user to which the symbols are being transmitted. In some embodiments, the beamforming weights may be generated based upon eigenbeam vectors generated at the receiver 402 and provided as feedback to the transmitter 400. Further, in those cases of scheduled transmissions, the TX data processor 414 can select the packet format based upon rank information that is transmitted from the user.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed on provided by processor 430. As discussed above, in some embodiments, the packet format for one or more streams may be varied according to the rank information that is transmitted from the user.

The modulation symbols for all data streams are then provided to a TX MIMO processor 420, which may further process the modulation symbols (e.g., for OFDM). TX MIMO processor 420 then provides $N_T$ modulation symbol streams to $N_T$ transmitters (TMTR) 422a through 422t. In certain embodiments, TX MIMO processor 420 applies beamforming weights to the symbols of the data streams based upon the user to which the symbols are being transmitted and the antenna from which the symbol is being transmitted from that users channel response information.

Each transmitter 422 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 422a through 422t are then transmitted from $N_T$ antennas 424a through 424t, respectively.

At receiver system 450, the transmitted modulated signals are received by $N_R$ antennas 452a through 452r and the received signal from each antenna 452 is provided to a respective receiver (RCVR) 454. Each receiver 454 conditions (e.g., filters, amplifies, and downconverts) a respective received signal, digitizes the conditioned signal to provide samples, and further processes the samples to provide a corresponding "received" symbol stream.

An RX data processor 460 then receives and processes the $N_R$ received symbol streams from $N_R$ receivers 454 based on a particular receiver processing technique to provide $N_T$ "detected" symbol streams. The processing by RX data processor 460 is described in further detail below. Each detected symbol stream includes symbols that are estimates of the modulation symbols transmitted for the corresponding data stream. RX data processor 460 then demodulates, deinterleaves, and decodes each detected symbol stream to recover the traffic data for the data stream. The processing by RX data processor 460 is complementary to that performed by TX MIMO processor 420 and TX data processor 414 at transmitter system 410.

The channel response estimate generated by RX processor 460 may be used to perform space, space/time processing at the receiver, adjust power levels, change modulation rates or schemes, or other actions. RX processor 460 may further estimate the signal-to-noise-and-interference ratios (SNRs) of the detected symbol streams, and possibly other channel characteristics, and provides these quantities to a processor 470. RX data processor 460 or processor 470 may further derive an estimate of the "operating" SNR for the system. Processor 470 then provides estimated channel state information (CSI), which may comprise various types of information regarding the communication link and/or the received data stream. For example, the CSI may comprise only the operating SNR. The CSI is then processed by a TX data processor 438, which also receives traffic data for a number of data streams from a data source 476, modulated by a modulator 480, conditioned by transmitters 454a through 454r, and transmitted back to transmitter system 410.

In addition, processor 470 may calculate the eigenbeams experienced by the receiver 402. The eigenbeams may be calculated as discussed with respect to FIG. 3. The processor 470 may then determine the dominant eigenbeams and feedback may only be provided for them. Processor 470 can quantize the dominant eigenbeams according to a codebook that is known are transmitter 400. In some embodiments, as described with respect to FIG. 3 five-bit codes may be utilized allowing a wide range of feedback. The codebook size can vary depending on the reverse link resources available for such feedback.

In order to determine when to feedback the dominant eigenbeams, processor 470 may calculate channel statistics and determine what the change was in the channel statistics between two or more consecutive transmissions to the receiver 402. Depending on the degree of change, a decision may be made as to whether to provide eigenbeam feedback. In additional embodiments, the processor may determine instantaneous channel information for a particular transmission and then determine a change between instantaneous channel information for one or more prior transmissions. This information may them be utilized to determine whether to provide eigenbeam feedback.

At transmitter system 410, the modulated signals from receiver system 450 are received by antennas 424, conditioned by receivers 422, demodulated by a demodulator 440, and processed by a RX data processor 442 to recover the CSI reported by the receiver system. The reported CSI is then provided to processor 430 and used to (1) determine the data rates and coding and modulation schemes to be used for the data streams and (2) generate various controls for TX data processor 414 and TX MIMO processor 420.

At the receiver, various processing techniques may be used to process the $N_R$ received signals to detect the $N_T$ transmitted symbol streams. These receiver processing techniques may be grouped into two primary categories (i) spatial and space-time receiver processing techniques (which are also referred to as equalization techniques); and (ii) "successive nulling/equalization and interference cancellation" receiver processing technique (which is also referred to as "successive interference cancellation" or "successive cancellation" receiver processing technique).

A MIMO channel formed by the $N_T$ transmit and $N_R$ receive antennas may be decomposed into $N_S$ independent channels, with $N_S \leq \min\{N_T, N_R\}$. Each of the $N_S$ independent channels may also be referred to as a spatial subchannel (or a transmission channel) of the MIMO channel and corresponds to a dimension.

For a full-rank MIMO channel, where $N_S = N_T \leq N_R$, an independent data stream may be transmitted from each of the $N_T$ transmit antennas. The transmitted data streams may experience different channel conditions (e.g., different fading and multipath effects) and may achieve different signal-to-noise-and-interference ratios (SNRs) for a given amount of transmit power. Moreover, in those cases that successive interference cancellation processing is used at the receiver to recover the transmitted data streams, and then different SNRs may be achieved for the data streams depending on the specific order in which the data streams are recovered. Consequently, different data rates may be supported by different data streams, depending on their achieved SNRs. Since the channel conditions typically vary with time, the data rate supported by each data stream also varies with time.

The MIMO design may have two modes of operation, single code word (SCW) and multiple-code word (MCW). In MCW mode, the transmitter can encode the data transmitted on each spatial layer independently, possibly with different rates. The receiver employs a successive interference cancellation (SIC) algorithm which works as follows: decode the first layer, and then subtract its contribution from the received signal after re-encoding and multiplying the encoded first layer with an "estimated channel," then decode the second layer and so on. This "onion-peeling" approach means that each successively decoded layer sees increasing SNR and hence can support higher rates. In the absence of error-propagation, MCW design with SIC achieves maximum system transmission capacity based upon the channel conditions. The disadvantage of this design arise from the burden of "managing" the rates of each spatial later (a) increased CQI feedback (one CQI for each layer needs to be provided); (b) increased acknowledgement (ACK) or negative acknowledgement (NACK) messaging (one for each layer); (c) complications in Hybrid ARQ (HARQ) since each layer can terminate at different transmissions; (d) performance sensitivity of SIC to channel estimation errors with increased Doppler, and/or low SNR; and (e) increased decoding latency requirements since each successive layer cannot be decoded until prior layers are decoded.

In a SCW mode design, the transmitter encodes the data transmitted on each spatial layer with "identical data rates." The receiver can employ a low complexity linear receiver such as a Minimum Mean Square Solution (MMSE) or Zero Frequency (ZF) receiver, or non-linear receivers such as QRM, for each tone. This allows reporting of the channel estimates by the receiver to be for only the "best" layer and reduced transmission overhead for providing this information.

While FIG. 4 and the associated discussion refers to a MIMO system, other systems multi-input single-input (MISO) and single-output multi-input (SIMO) may also utilize the structures of FIG. 4 and the structures, methods and systems discussed with respect to FIG. 3.

Figure 5:
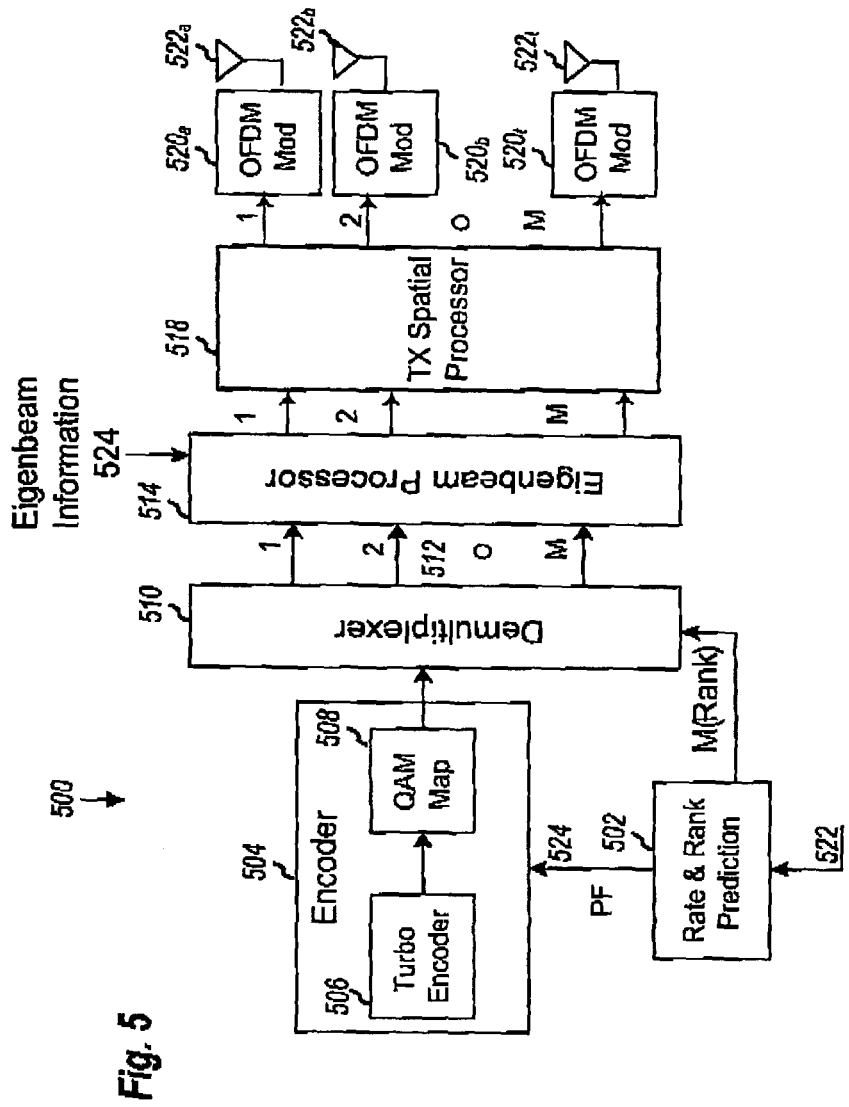
FIG. 5 illustrates a block diagram of a transmitter system in a multiple access wireless communication system according to an embodiment.

Referring to FIG. 5, a block diagram of a transmitter system in a multiple access wireless communication system according to one embodiment is illustrated. Transmitter 500, based upon channel information, utilizes rate prediction block 502 which controls a single-input single-output (SISO) encoder 504 to generate an information stream.

Bits 506 are turbo-encoded by encoder block 506 and mapped to modulation symbols by mapping block 508 depending on the packet format (PF) 524, specified by a rate prediction block 502. The coded symbols are then de-multiplexed by a demultiplexer 510 to M layers 512, which are provided to a beamforming module 514.

Beamforming module 514 generates an $N_T \times M$ beamforming matrix. The matrix may be formed for each transmission on the reverse link. Each transmission may involve processes M layers and generate $N_T$ streams. The eigen-beam weights may be generated from the eigenbeam feedback 524, e.g. quantized eigenvectors, transmitted by the access terminal to the access point. Further, as described above the feedback may comprise only the dominant eigenvectors experienced at the access terminal.

The $N_T$ streams 512 after beamforming are provided to OFDM modulators 518a to 518t that interleave the output symbol streams with pilot symbols. The OFDM processing for each transmit antenna 520a to 520t then in an identical fashion, after which the signals are transmitted via a MIMO scheme.

In SISO encoder 504, turbo encoder 506 encodes the data stream, and in an embodiment uses 1/5 encoding rate. It should be noted that other types of encoders and encoding rates may be utilized. Symbol encoder 508 maps the encoded data into the constellation symbols for transmission. In one embodiment, the constellations may be Quadrature-Amplitude constellations. While a SISO encoder is described herein, other encoder types including MIMO encoders may be utilized.

Rate prediction block 502 processes the CQI and/or channel estimate information, including rank information, which is received at the access point for each access terminal. The rank information may be provided based upon broadband pilot symbols, hop based pilot symbols, or both. The rank information is utilized to determine a modulation rate by rate prediction block 502. In an embodiment, the rate prediction algorithm may use a 5-bit CQI feedback 522 approximately every 5 milliseconds and/or channel estimates. The actual number of bits of CQI feedback 22 may vary based upon design choices or parameters.

The packet format, e.g. modulation rate, is determined using several techniques. Exemplary techniques are depicted and disclosed in co-pending U.S. patent application Ser. No. 11/021,791, entitled "Performance Based Rank Prediction for MIMO Design," and U.S. patent application Ser. No. 11/022,347, entitled "Capacity Based Rank Prediction for MIMO Design," both of which are incorporated herein by reference as if set forth in their entireties.

Figure 6:
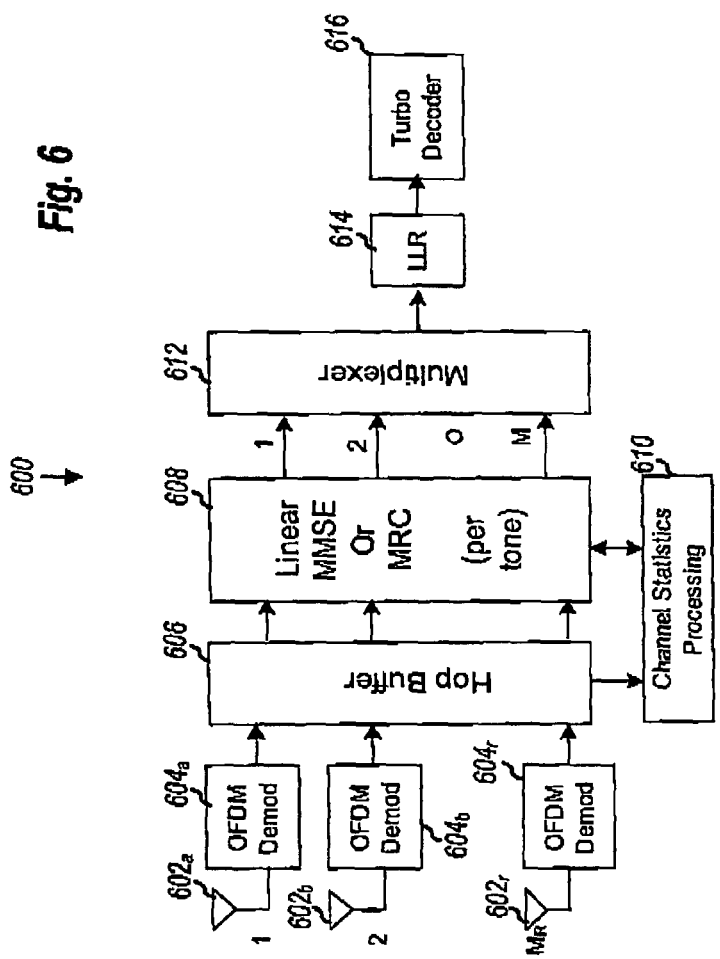
FIG. 6 illustrates a block diagram of a receiver system in a multiple access wireless communication system according to an embodiment.

Referring to FIG. 6, a block diagram of a receiver system in a multiple access wireless communication system according to one embodiment is illustrated. In FIG. 6, each antenna 602a through 602t receives one or more symbols intended for the receiver 600. The antennas 602a through 602t are each coupled to OFDM demodulators 604a to 604t, each of which is coupled to hop buffer 606. The OFDM demodulators 704a to 604t each demodulate the OFDM received symbols into received symbol streams. Hop buffer 606 stores the received symbols for the hop region in which they were transmitted.

The output of hop buffer 606 is provided to a decoder 608, which may be a decoder that independently processes each carrier frequency of the OFDM band. Both hop buffer 606 and the decoder 608 are coupled to a channel statistics processing 610 that also forms the eigenbeamweights that can be provided to the transmitter for future transmissions. In addition, channel statistics processing 610 determines channel statistics, second order channel statistics, instantaneous channel information, or signal-to-noise ratios for multiple transmissions. The channel statistics processing 610 can also determine whether changes have occurred and then transmit the eigenbeam feedback. In addition, receiver 600 may determine the available reverse link resources, The demodulated information streams are then provided to Log-Likelihood-Ratio block 612 and decoder 614, which may be a turbo decoder or other decoder to match the encoder used at the access point, that provide a decoded data stream for processing.

Figure 7:
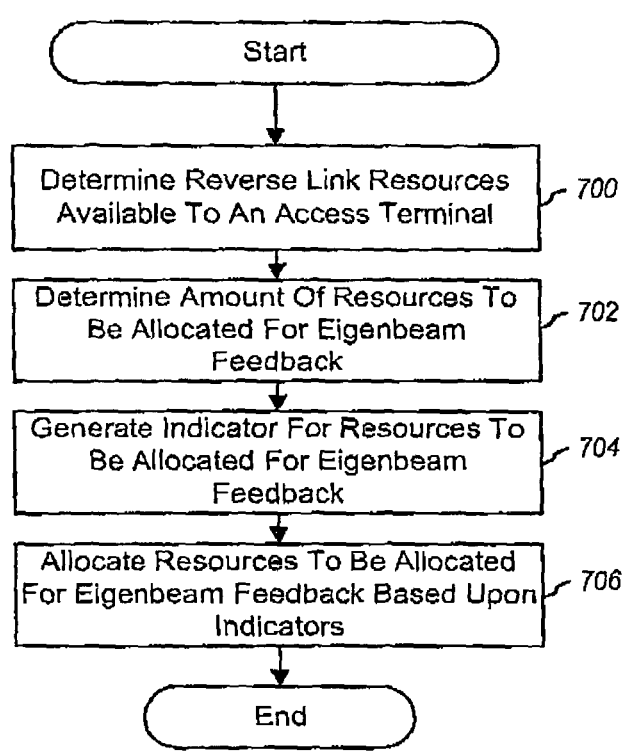
FIG. 7 illustrates a flow chart of determining resources to be allocated for providing eigenbeam feedback according to an embodiment.

Referring to FIG. 7, a flow chart of determining resources to be allocated for providing eigenbeam feedback according to an embodiment is illustrated. A determination is made as to the available reverse link resources, block 700. The resources may be the number of symbols that may be transmitted over a reverse link signaling or control channel, the available bandwidth, or other information. This determination may be made at an access point and provided to the access terminal or at the access terminal based upon fixed parameters or data rates for the next forward link transmission.

A determination is then made as to the amount of eigenbeam feedback that is available at the access terminal, block 702. The amount may be the total number of eigenbeams, the number of dominant eigenbeams, or a ranking of the eigenbeams. Further, the amount may include rank information or CQI information so that the amount takes into account all or most of the feedback required from the access terminal.

An indicator as to the resources allocated for reverse link transmission is generated, block 704. The indicator may be generated at either the access point or access terminal and then transmitted to the access terminal. Resources on the reverse link are then allocated for transmission based upon the indicator, block 706.

Figure 8:
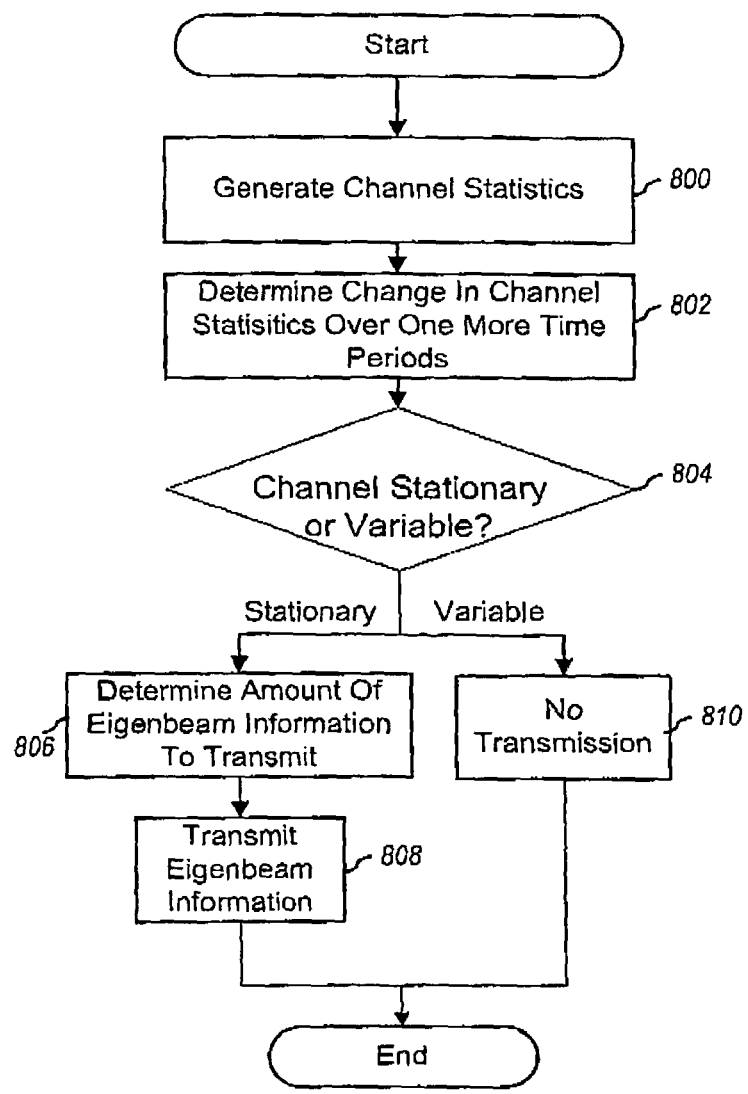
FIG. 8 illustrates a flow chart of determining whether to provide eigenbeam feedback according to another embodiment.

Referring to FIG. 8, a flow chart of determining whether to provide eigenbeam feedback according to another embodiment is illustrated. Channel information is generated, block 800. The channel information may be instantaneous channel information or channel statistics. In some embodiments, the channel information may relate to the packet error rate, fading, signal strength, channel state information or other information. Further, the channel information calculated in either, or both, the frequency and time domain may be utilized. Further, in some embodiments, second order channel statistics are utilized. In other embodiments, first order or higher order channel statistics are utilized in addition to, or in lieu of, the second order channel statistics. In some embodiments, the channel information may be calculated based upon pilot symbols or both pilot symbols and data symbols.

The change in channel information is determined, block 802. The change may be between consecutive transmissions, between the current transmission and a transmission N transmissions prior to the current transmission, time averaged changes, averages over M transmissions, or other approaches. In one embodiment, the changes may be calculated as the absolute value of the difference of the squares of the channel information for the current transmission and a transmission that is N transmissions prior to the current transmission.

A determination is made whether a channel between an access terminal and access point is stationary or variable, block 804. In an embodiment, this determination may be made based upon if the change in channel statistics is above or below a threshold. In other embodiments, the determination may be based on a rate of change between several determinations of the change of the channel information. Other approaches may also be utilized to determine whether the channel is stationary or variable.

In the case where the channel is determined to be stationary, the dominant eigenbeams are determined, block 806. Information regarding the dominant eigenbeams is then transmitted to the access point, block 808. The information regarding the dominant eigenbeams may be quantized according to a codebook. Also, it should be noted that block 806 may occur at any time prior to block 804 and may be independent of the process depicted in FIG. 8. In the case where the channel is determined to be variable, no feedback is provided, block 810.

Figure 9:
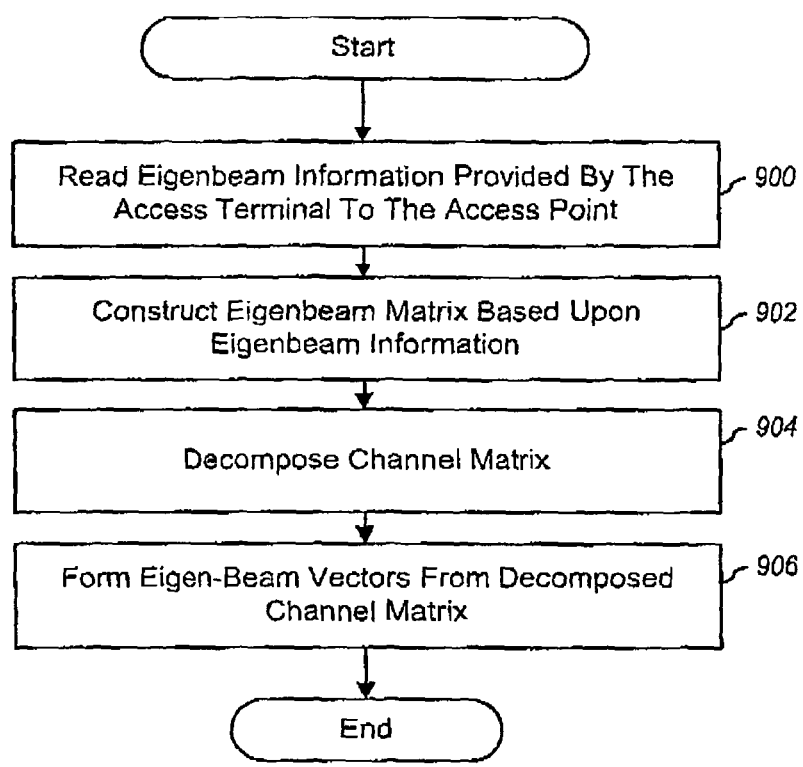
FIG. 9 illustrates a flow chart of generating eigenbeam vectors according to a further embodiment.

Referring to FIG. 9, a flow chart of generating eigenbeam vectors according to a further embodiment is illustrated. The eigenbeam information provided from the terminal to the access point is read, block 900. As discussed previously, in some embodiments, the eigenbeam information may be quantized and therefore the appropriate information is read from a codebook for use at block 900. Further, the eigenbeam information may apply to only the dominant eigenbeams.

The eigenbeam information is utilized to construct an eigenbeamforming matrix, block 902. The eigenbeamforming matrix is then decomposed, block 904. The decomposition may be a QR decomposition. The eigenvectors representing the beamforming weights can then be generated for the symbols of the next hop region to be transmitted to the access terminal, block 906.

Figure 10:
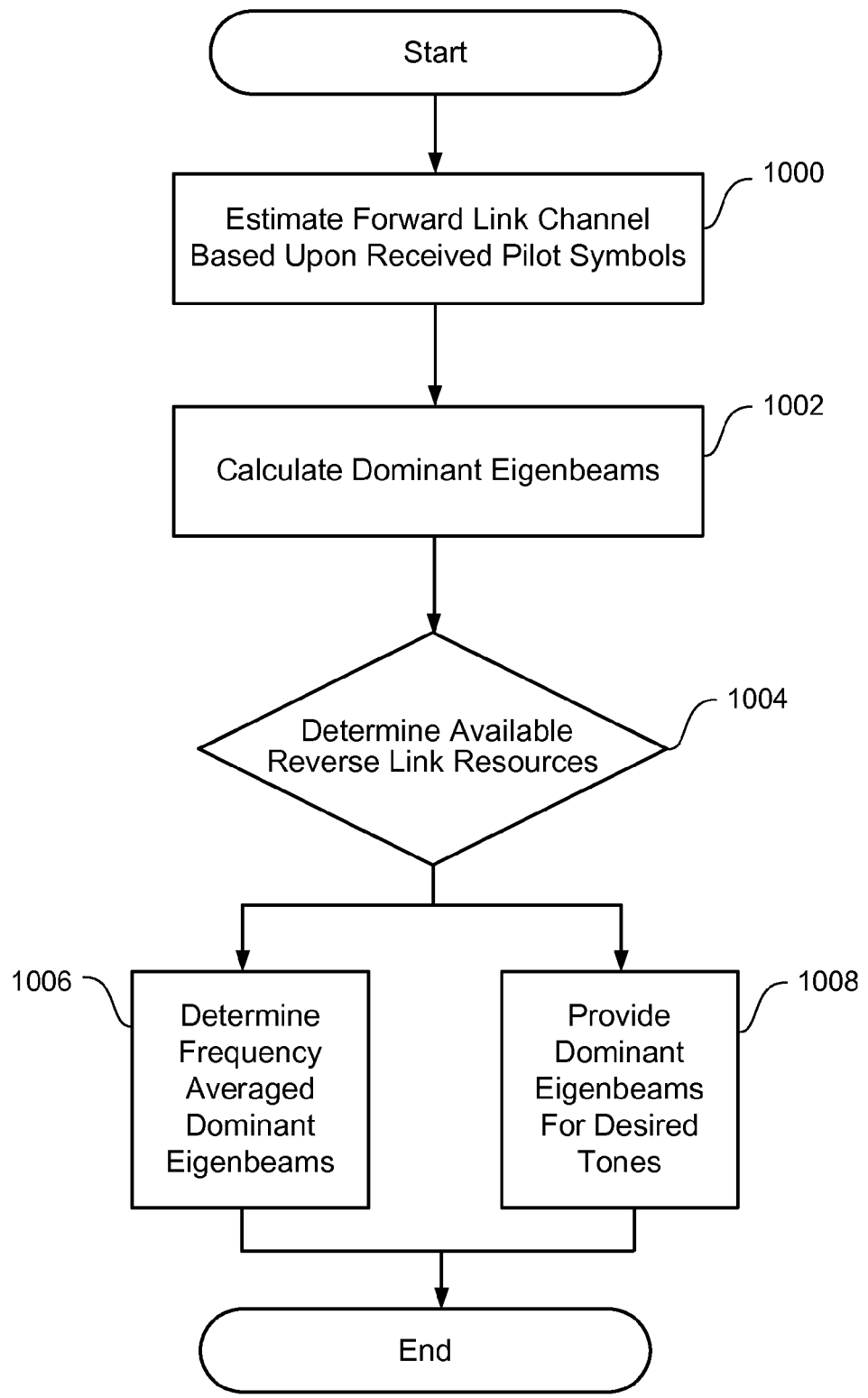
FIG. 10 illustrates a flow chart of generating eigenbeam feedback according an embodiment.

Referring to FIG. 10, a flow chart of generating eigenbeam feedback according an embodiment is illustrated. The forward link channel is estimated based upon received symbols, such as pilot symbols, block 1000. The dominant eigenbeams are then determined and calculated based upon the forward link channel estimate, block 1002. A determination is made as to the amount of available reverse link resources, block 1004. The resources may be the number of symbols that may be transmitted over a reverse link signaling or control channel, the available bandwidth, or other information. This determination may be made at an access point and provided to the access terminal or at the access terminal based upon fixed parameters or data rates for the next forward link transmission.

In the case where the reverse link resources are considered low, a frequency average of the dominant eigenbeams are determined, prior to being provided as feedback to the access point, block 1006. In the case where the reverse link resources are considered high, the dominant eigenbeams for each required frequency are provided as feedback to the access point, block 1008.

The above processes may be performed utilizing TX processor 420 or 460, processor 430 or 470, and memory 432 or 472. Further processes, operations, and features described with respect to FIGS. 5A, 5B, and 6-10 may be performed on any processor, controller, and/or other processing device and may be stored as computer readable instructions in a computer readable medium as source code, object code, or otherwise.

The techniques described herein may be implemented by various means. For example, these techniques may be implemented in hardware, software, or a combination thereof. For a hardware implementation, the processing units within a access point or a access terminal may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

The previous description of the disclosed embodiments is provided to enable any person skilled in the art to make or use the features, functions, operations, and embodiments disclosed herein. Various modifications to these embodiments may be readily apparent to those skilled in the art, and the generic principles defined herein may be applied to other embodiments without departing from their spirit or scope. Thus, the present disclosure is not intended to be limited to the embodiments shown herein but is to be accorded the widest scope consistent with the principles and novel features disclosed herein.

The invention claimed is:

1. A wireless communication apparatus comprising:
at least two antennas;
and a processor operative to determine available reverse link transmission resources in a multiple-input-multiple-output orthogonal frequency division multiplexing (MIMO-OFDM) frequency division duplexed (FDD) system operative to generate and provide to an access terminal an indicator of reverse link transmission resources allocated for transmission of the beamforming information, wherein the indicator is based at least upon the determination of the available reverse link transmission resources, operative to cause allocation at the access terminal of reverse link resources for transmission of the beamforming information in accordance with the indicator, and operative to cause the beamforming information to be transmitted based upon the reverse link resources allocated in accordance with the indicator.

2. The wireless communication apparatus of claim 1, wherein the processor is further operative to determine the available reverse link transmission resources based upon a number of users transmitting reverse link transmissions.

3. The wireless communication apparatus of claim 2, wherein the processor is further operative to cause the indicator to be transmitted from the at least two antennas.

4. The wireless communication apparatus of claim 1, wherein the processor is further operative to determine the available reverse link transmission resources based upon a forward link transmission to a wireless communication device.

5. The wireless communication apparatus of claim 1, wherein the reverse link resources comprise data channels and control channels.

6. The wireless communication apparatus of claim 1, wherein the indicator further comprises information as to a number of eigenbeams to be fedback over the reverse link transmission resources allocated.

7. The wireless communication apparatus of claim 1, wherein the wireless communication apparatus comprises an access terminal.

8. The wireless communication apparatus of claim 1, wherein the wireless communication apparatus comprises an access point.

9. The wireless communication apparatus of claim 1, wherein transmitting beamforming information based upon the reverse link resources allocated in accordance with the indicator comprises transmitting feedback information based upon per hop based eigenbeam information.

10. An electronic device comprising:
a processor; and
a memory, coupled with the processor, and storing computer-readable instructions that, when executed by the processor, cause the processor
to determine whether to transmit eigenbeam information from the at least one antenna in a multiple-input-multiple-output orthogonal frequency division multiplexing (MIMO-OFDM) frequency division duplexed (FDD) system based upon channel information, the channel information comprising at least channel statistics, and
to determine whether the channel is stationary or variable based upon the channel statistics and to transmit the eigenbeam information if the channel is determined to be stationary, and to not transmit the eigenbeam information if the channel is determined to be variable.

11. The electronic device of claim 10, wherein the instructions that, when executed by the processor cause the processor to determine whether the channel is stationary or variable, cause the processor to determine whether the channel is stationary or variable based upon whether a change in the channel statistics within a time period exceeds a threshold.

12. The electronic device of claim 10, wherein the instructions stored in the memory, when executed by the processor, also cause the processor to determine a number of eigenbeams for which to transmit eigenbeam information based upon the channel statistics.

13. The electronic device of claim 12, wherein the instructions that, when executed by the processor cause the processor to determine a number of eigenbeams for which to transmit eigenbeam information, cause the processor to determine the number of eigenbeams for which to transmit eigenbeam information to be less than all eigenbeams utilized for transmission to the wireless communication apparatus.

14. The electronic device of claim 10, wherein the instructions stored in the memory, when executed by the processor, also cause the processor to determine the channel statistics at predetermined time intervals.

15. The electronic device of claim 14, wherein the instructions that, when executed by the processor cause the processor to determine the channel statistics at predetermined time intervals, cause the processor to determine a length of the predetermined time intervals based upon an instruction received at the at least one antenna.

16. The electronic device of claim 10, wherein the eigenbeam information comprises information corresponding to one or more eigenvectors of signals received at the wireless communication apparatus.

17. The electronic device of claim 16, wherein the instructions stored in the memory, when executed by the processor, also cause the processor to average terms of the one or more eigenvectors over multiple signals received at the wireless communication apparatus.

18. The electronic device of claim 16, wherein the one or more eigenvectors comprise one or more time averaged eigenvectors.

19. The electronic device of claim 16, wherein the instructions stored in the memory, when executed by the processor, also cause the processor to average terms of the one or more eigenvectors over multiple subcarriers of the signals received at the wireless communication apparatus.

20. The electronic device of claim 16, wherein the one or more eigenvectors comprise one or more subcarriers averaged eigenvectors.

21. The electronic device of claim 10, wherein the eigenbeam information comprises information corresponding to one or more eigenvectors of signals received at the wireless communication apparatus and an eigenvalue of each of the one or more eigenvectors.

22. The electronic device of claim 10, wherein the eigenbeam information comprises information corresponding to dominant eigenvectors of signals received at the wireless communication apparatus.

23. The electronic device of claim 10, wherein the instructions stored in the memory, when executed by the processor, also cause the processor to quantize the eigenbeam information according to a codebook.

24. The electronic device of claim 10, wherein the instructions stored in the memory, when executed by the processor, also cause the processor to quantize complex elements of the eigenbeam information using a desired number of bits.

25. The electronic device of claim 10, wherein the instructions stored in the memory, when executed by the processor, also cause the processor to quantize complex elements of the eigenbeam information according to a pre-determined constellation.

26. The electronic device of claim 10, wherein the instructions stored in the memory, when executed by the processor, also cause the processor to quantize some of the elements of the eigenbeam information.

27. The electronic device of claim 10, wherein the channel information comprises second order channel statistics.

28. The electronic device of claim 10, wherein the instructions stored in the memory, when executed by the processor, also cause the processor to determine whether to transmit eigenbeam information based upon the channel statistics and received instructions.

29. The electronic device of claim 10, wherein the channel information comprises instantaneous channel information.

30. A method of resource allocation in a wireless communication system comprising:
determining reverse link resources available at a wireless communication apparatus for communication in a multiple-input-multiple-output orthogonal frequency division multiplexing (MIMI-OFDM) frequency division duplexed (FDD) system; and transmitting beamforming feedback based upon a result of determining reverse link resources available at the wireless communication apparatus, wherein the transmitting comprises:

transmitting feedback comprising frequency averaged eigenbeam information in response to the result indicating low available reverse link resources available at the wireless communication apparatus, and transmitting feedback comprising dominant eigenbeams in response to the result indicating high available reverse link resources available at the wireless communication apparatus.

31. The method of claim 30, wherein determining reverse link transmission resources available at the wireless communication apparatus comprises determining a number of users transmitting reverse link transmissions.

32. The method of claim 31, further comprising:
assigning beamforming feedback resources on the reverse link based upon a result of determining reverse link resources available at the wireless communication apparatus; and
transmitting an indicator of the assigned beamforming feedback resources.

33. The method of claim 30, wherein determining reverse link resources available is based upon a forward link transmission.

34. The method of claim 30, wherein the reverse link resources comprise data channels and control channels.

35. The method of claim 30, further comprising:
assigning beamforming feedback resources on the reverse link based, at least in part, on a result of determining reverse link resources available at the wireless communication apparatus and wherein a number of eigenbeams to be fedback.

36. The method of claim 30, wherein the wireless communication apparatus comprises an access terminal.

37. The method of claim 30, wherein the wireless communication apparatus comprises an access point.

38. A method of resource allocation in a wireless communication system comprising:
generating eigenbeam information in a multiple-input-multiple-output orthogonal frequency division multiplexing (MIMI-OFDM) frequency division duplexed (FDD) system at wireless communication device;
generating channel information regarding a communication channel with respect to the wireless communication device, wherein the channel information comprises channel statistics;
determining, based at least in part upon the channel information, whether to transmit the eigenbeam information; and
transmitting the eigenbeam information in accordance with a result of said determining whether to transmit, wherein
determining whether to transmit includes determining whether the channel is stationary or variable based on the channel statistics, and
wherein transmitting the eigenbeam information in accordance with the result of said determining whether to transmit includes
transmitting the eigenbeam information if the channel is determined to be stationary, and
not transmitting the eigenbeam information if the channel is determined to be variable.

39. The method of claim 38, wherein determining whether the channel is stationary or variable comprises determining based upon whether a change in the channel statistics within a time period exceeds a threshold.

40. The method of claim 38, further comprising determining a number of eigenbeams for which to transmit eigenbeam information based upon the channel statistics.

41. The method of claim 40, wherein determining the number of eigenbeams comprises determining a number of eigenbeams to be less than all of the eigenbeams utilized for transmission to the wireless communication apparatus.

42. The method of claim 38, wherein determining whether to transmit the eigenbeam information further comprises determining whether to transmit frequency averaged eigenbeam information based upon the channel statistics.

43. The method of claim 38, wherein generating channel statistics comprises generating channel statistics at predetermined time intervals.

44. The method of claim 38, wherein the eigenbeam information comprises information corresponding to one or more eigenvectors of signals received at the wireless communication apparatus.

45. The method of claim 44, further comprising averaging the one or more eigenvectors over multiple received signals.

46. The method of claim 44, further comprising averaging the one or more eigenvectors over multiple subcarriers of signals received.

47. The method of claim 38, wherein the eigenbeam information comprises information corresponding to one or more eigenvectors and an eigenvalue of each of the one or more eigenvectors.

48. The method of claim 38, wherein the eigenbeam information comprises information corresponding to dominant eigenvectors of signals received.

49. The method of claim 38, further comprising quantizing the eigenbeam information according to a codebook.

50. The method of claim 38, further comprising quantizing the eigenbeam information for an eigenbeam having a minimum mean squared error.

51. The method of claim 38, wherein the channel information comprises second order channel statistics.

52. The method of claim 38, wherein determining whether to transmit eigenbeam information is further based upon received instructions.

53. The method of claim 38, wherein the channel information comprises instantaneous channel information.

54. An apparatus comprising:
means for determining reverse link resources available for communication in a multiple-input-multiple-output orthogonal frequency division multiplexing (MIMO-OFDM) frequency division duplexed (FDD) system based at least in part upon an available bandwidth of the control channel;
means for generating and providing, based at least in part on a result of determining reverse link resources available to an access terminal an indicator of reverse link resources allocated for transmission of the beamforming feedback;
means for assigning beamforming feedback resources on the reverse link based at least in part on the indicator; and
means for causing a message including the beamforming feedback to be transmitted based upon the reverse link resources assigned.

55. The apparatus of claim 54, wherein determining the available reverse link transmission resources is based upon a number of users transmitting reverse link transmissions.

56. The apparatus of claim 54, wherein determining reverse link resources available is based upon a forward link transmission to the apparatus.

57. The apparatus of claim 54, wherein the means for assigning comprises means for assigning a number of eigenbeams to be feedback over the reverse link resources assigned.

58. An apparatus comprising:
means for generating eigenbeam information for communication in a multiple-input-multiple-output orthogonal frequency division multiplexing (MIMO-OFDM) frequency division duplexed (FDD) system;
means for generating channel information regarding a communication channel with respect to the apparatus, the channel information comprising at least channel statistics;
means for determining, based at least in part upon the channel information, and whether to transmit the eigenbeam information; and
means for transmitting the eigenbeam information in accordance with a result of said determining whether to transmit,
wherein the means for determining whether to transmit includes means for determining whether the channel is stationary or variable based on the channel statistics, and
wherein the means for transmitting the eigenbeam information in accordance with the result of said determining whether to transmit comprises:
means for transmitting the eigenbeam information if the channel is determined to be stationary, and
means for not transmitting the eigenbeam information if the channel is determined to be variable.

59. The apparatus of claim 58, wherein the means for determining whether the channel is stationary or variable comprises means for determining based upon whether a change in the channel statistics within a time period exceeds a threshold.

60. The apparatus of claim 58, wherein the means for determining whether to transmit comprises means for determining a number of eigenbeams for which to transmit eigenbeam information based upon the channel statistics.

61. The apparatus of claim 60, wherein the number of eigenbeams is less than all eigenbeams utilized for transmission to the wireless communication apparatus.

62. The apparatus of claim 58, wherein the means for generating channel statistics comprises means for generating channel statistics at predetermined time intervals.

63. The apparatus of claim 58, further comprising means for averaging one or more eigenvectors over multiple received signals.

64. The apparatus of claim 58, further comprising means for averaging the one or more eigenvectors over multiple subcarriers of signals received.

65. The apparatus of claim 58, wherein the eigenbeam information comprises information corresponding to dominant eigenvectors of signals received.

66. The apparatus of claim 58, further comprising means for quantizing the eigenbeam information according to a codebook.

67. The apparatus of claim 58, further comprising means for quantizing each complex element of the eigenbeam information according to a pre-determined constellation.

68. The electronic device of claim 58, further comprising means for quantizing some elements of the eigenbeam information.

69. The apparatus of claim 58, wherein the channel information comprises second order channel statistics.

70. The apparatus of claim 58, wherein the means for determining whether to transmit eigenbeam information comprises means for determining whether to transmit based upon channel statistics and received instructions.

71. The apparatus of claim 58, wherein the channel information comprises instantaneous channel information.

72. The apparatus of claim 58, wherein determining whether the channel is stationary or variable is based upon whether the channel statistics change within a time period.

73. The apparatus of claim 58, wherein determining whether the channel is stationary or variable is based upon whether a change in the channel statistics within a time period exceeds a threshold.

74. The apparatus of claim 58, wherein determining whether to transmit comprises determining a number of eigenbeams for which to transmit eigenbeam information based upon the channel statistics.

75. The apparatus of claim 58, wherein determining whether to transmit eigenbeam information is based upon channel statistics and received instructions.

76. The apparatus of claim 58, wherein generating channel statistics includes generating channel statistics at predetermined time intervals.

77. A non-transitory computer-readable medium comprising instructions, which, when executed by a processor apparatus in a wireless communications system, cause the processor apparatus to perform operations carrying out a method of resource allocation in the wireless communication system, comprising instructions that cause the processor apparatus to:
determine reverse link resources available at a wireless communication apparatus for communication in a multiple-input-multiple-output orthogonal frequency division multiplexing (MIMI-OFDM) frequency division duplexed (FDD) system; and
transmit beamforming feedback based upon a result of determining reverse link resources available at the wireless communication apparatus, wherein the transmitting comprises:
transmitting feedback comprising frequency averaged eigenbeam information in response to the result indicating low available reverse link resources available at the wireless communication apparatus, and
transmitting feedback comprising dominant eigenbeams in response to the result indicating high available reverse link resources available at the wireless communication apparatus.

78. A non-transitory computer-readable medium comprising instructions, which, when executed by a processor apparatus in a wireless communications system, cause the processor apparatus to perform operations carrying out a method of resource allocation in the wireless communication system, comprising instructions that cause the processor apparatus to:
generate eigenbeam information in a multiple-input-multiple-output orthogonal frequency division multiplexing (MIMI-OFDM) frequency division duplexed (FDD) system at wireless communication device;
generate channel information regarding a communication channel with respect to the wireless communication device, wherein the channel information comprises channel statistics;
determine, based at least in part upon the channel information, whether to transmit the eigenbeam information; and
transmit the eigenbeam information in accordance with a result of said determining whether to transmit, wherein determining whether to transmit includes determining whether the channel is stationary or variable based on the channel statistics, and wherein transmitting the eigenbeam information in accordance with the result of said determining whether to transmit includes transmitting the eigenbeam information if the channel is determined to be stationary, and not transmitting the eigenbeam information if the channel is determined to be variable.

79. A non-transitory computer-readable medium comprising instructions, which, when executed by a processor apparatus in a wireless communications system, cause the processor apparatus to perform operations carrying out a method of resource allocation in the wireless communication system, comprising instructions that cause the processor apparatus to:

determine reverse link resources available for communication in a multiple-input-multiple-output orthogonal frequency division multiplexing (MIMO-OFDM) frequency division duplexed (FDD) system based at least in part upon an available bandwidth of the control channel;

generate and provide, based at least in part on a result of determining reverse link resources available to an access terminal an indicator of reverse link resources allocated for transmission of the beamforming feedback;

assign beamforming feedback resources on the reverse link based at least in part on the indicator; and cause a message including the beamforming feedback to be transmitted based upon the reverse link resources assigned.

* * * * *